United States Patent
Tham et al.

(10) Patent No.: US 12,518,464 B2
(45) Date of Patent: Jan. 6, 2026

(54) SHARING RECEIVED OBJECTS WITH CO-LOCATED USERS

(71) Applicants: Yu Jiang Tham, Seattle, WA (US); Rajan Vaish, Beverly Hills, CA (US); Sven Kratz, Mercer Island, WA (US)

(72) Inventors: Yu Jiang Tham, Seattle, WA (US); Rajan Vaish, Beverly Hills, CA (US); Sven Kratz, Mercer Island, WA (US)

(73) Assignee: Snap Inc., Santa Monica, CA (US)

( * ) Notice: Subject to any disclaimer, the term of this patent is extended or adjusted under 35 U.S.C. 154(b) by 167 days.

(21) Appl. No.: 17/695,399

(22) Filed: Mar. 15, 2022

(65) Prior Publication Data

US 2023/0298247 A1 Sep. 21, 2023

(51) Int. Cl.
| | |
|---|---|
| G06T 15/00 | (2011.01) |
| G06T 1/20 | (2006.01) |
| H04L 51/08 | (2022.01) |
| H04L 51/222 | (2022.01) |
| H04L 65/1069 | (2022.01) |
| H04L 65/1089 | (2022.01) |

(Continued)

(52) U.S. Cl.
CPC .............. *G06T 15/005* (2013.01); *G06T 1/20* (2013.01); *H04L 51/08* (2013.01); *H04L 51/222* (2022.05); *H04L 65/1069* (2013.01); *H04L 65/1089* (2013.01); *H04N 13/111* (2018.05); *H04N 13/332* (2018.05); *H04N 13/398* (2018.05); *H04N 2213/008* (2013.01)

(58) Field of Classification Search
CPC .... G06F 3/04815; G06F 3/0482; G06F 3/011; G06T 2219/024; G06Q 10/10
See application file for complete search history.

(56) References Cited

U.S. PATENT DOCUMENTS

2013/0293468 A1 11/2013 Perez et al.
2018/0357794 A1* 12/2018 Young .................. G06T 11/001
(Continued)

FOREIGN PATENT DOCUMENTS

JP 2020162136 A 10/2020

OTHER PUBLICATIONS

International Search Report and Written Opinion for International Application No. PCT/US2023/014118, dated Jun. 21, 2023 (Jun. 21, 2023)—10 pages.

*Primary Examiner* — Ming Wu
(74) *Attorney, Agent, or Firm* — CM Law; Stephen J. Weed

(57) ABSTRACT

Users of electronic eyewear devices can interact with each other by sharing 3D objects (e.g., 2D or 3D augmented reality (AR) objects or scanned 2D or 3D images of real-world objects) with each other via local objects (real or virtual) in each user's environment established as personalized anchor points for social connection. When a user receives an object from another user, the user has the option to generate a connected session with other users that are co-located (physically or virtually at the same location) with the user. The co-located group of users in this new connected session may view the received object either on their personal electronic devices (e.g., smartphones) or on their electronic eyewear devices and can modify and annotate the shared object using collaboration software and AR display tools that enable modification and manipulation of the shared object.

18 Claims, 21 Drawing Sheets

(51) Int. Cl.
*H04N 13/111* (2018.01)
*H04N 13/332* (2018.01)
*H04N 13/398* (2018.01)

(56) References Cited

U.S. PATENT DOCUMENTS

| | | | |
|---|---|---|---|
| 2018/0373318 A1* | 12/2018 | Yang | G06F 3/012 |
| 2019/0014802 A1* | 1/2019 | Kasemsuwan | A23L 5/21 |
| 2020/0019295 A1 | 1/2020 | Spivack et al. | |
| 2020/0021668 A1 | 1/2020 | Lyons | |
| 2021/0241529 A1* | 8/2021 | Cowburn | H04N 7/157 |
| 2021/0405746 A1 | 12/2021 | Canberk et al. | |
| 2022/0317830 A1* | 10/2022 | Skuratowicz | G06F 3/0482 |
| 2022/0365831 A1* | 11/2022 | Weskamp | G06F 9/546 |

* cited by examiner

SHARING RECEIVED OBJECTS WITH CO-LOCATED USERS

TECHNICAL FIELD

The present disclosure relates to enabling social connections using portable electronic devices, including wearable electronic devices such as smart glasses. More particularly, but not by way of limitation, the present disclosure describes technologies that enable users of electronic eyewear devices to share received objects (e.g., augmented reality (AR) objects) with co-located users.

BACKGROUND

Wearable electronic devices such as electronic eyewear devices can communicate with application programs running on mobile devices such as a user's mobile computing device and, in some cases, communicate directly with a server. In either case, the electronic eyewear device may support direct device integration with messaging application services as well as third-party application programming interfaces (APIs) such as text-to-speech, the SHAZAM PLAYER® app, object recognition, and the like. The user of the electronic eyewear devices may select display features through interaction with the electronic eyewear device. Such devices may enable users to send objects to other connected users with whom the user has a pre-existing relationship ("friends") using the messaging application to make users feel more connected to one another to enhance the user experience.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
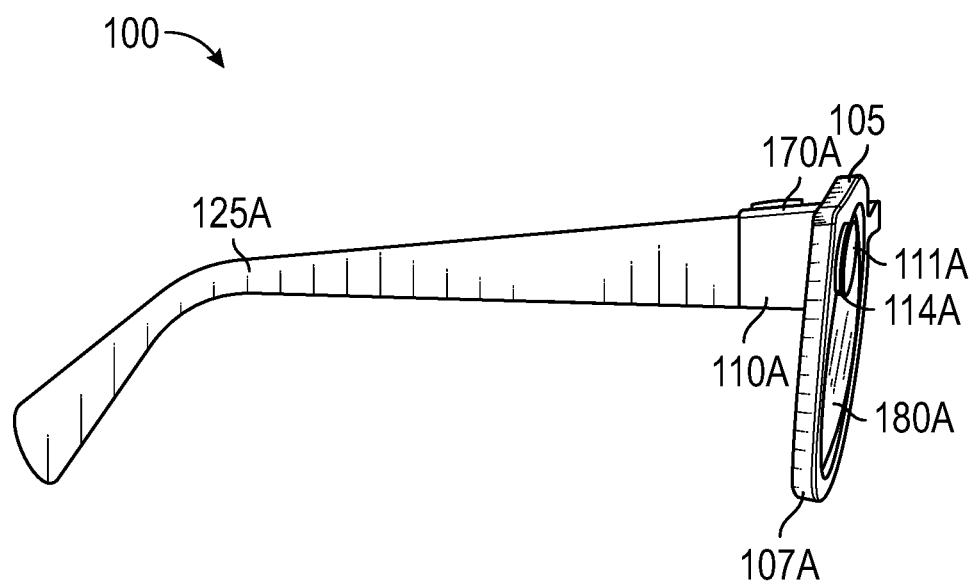
FIG. 1A is an illustration depicting a side view of an example electronic eyewear device including an optical assembly with an image display.

Users of electronic eyewear devices can interact with each other by sharing objects (e.g., 2D or 3D augmented reality (AR) objects or scanned 2D or 3D images of real-world objects) with each other, even remotely. That is, users that are not located in the vicinity of each other can interact with each other by using objects as anchor points. The examples described herein enable users of electronic eyewear devices to indirectly interact with one another by establishing objects (real or virtual) in each user's environment as personalized anchor points for social connection. The users may stay connected to each other by sharing objects between the personalized anchor points. The users also may share objects via a messaging system. This enables remote users of the mobile devices to feel more connected to each other.

In a sample configuration, when a user receives an object from another user, the user has the option to generate a connected session with other users that are co-located (physically or virtually at the same location) with the user. The co-located group of users in this new connected session may view the received object either on their personal electronic devices (e.g., smartphones) or on their electronic eyewear devices and can modify and annotate the shared object using collaboration software and AR display tools that enable modification and manipulation of the shared object.

For example, the content may be an object that is transmitted to a location in the vicinity of another user. The other user may receive the object and then establish a session with co-located users in order to share the received object with the co-located users. The co-located users may all view the object from their own individual perspectives (if the object is three-dimensional) and may use AR display tools to modify and manipulate the shared object during the session, as desired. The system enables AR content and images of real-world content to be "placed" in another user's world using one of three strategies. The content is either placed by an object tagged with the corresponding physical marker (marker-endpoint), the content is spawned in the vicinity of the remote user (user-endpoint), or the content is sent as an attachment to a message. In each case, the object is shared with co-located users using collaboration software.

The examples in this disclosure are thus directed to systems and methods for sharing a representation of an object amongst users. The methods include identifying co-located user(s) within range of a local communication network for sharing a received object to a display(s) of the co-located user(s), establishing a collaboration session with a user who received the object and the co-located user(s), and sharing the object with the co-located user(s) via the collaboration session. A presentation perspective of the received object may be varied as the position and orientation of the head of each co-located user relative to the object is changed. The co-located user(s) may modify the object using AR display tools, and the modified object may be forwarded back to the user who originally sent the object.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device and associated system for providing social connections between users of electronic eyewear devices will be described with respect to FIGS. 1-16.

The system described herein includes three types of hardware components: an electronic eyewear device, a mobile device, and a server. The electronic eyewear device will be described with respect to FIGS. 1-3, the mobile device will be described with respect to FIG. 5, and the server will be described with respect to FIG. 6. The corresponding system will be described with respect to FIG. 4. Operation of the software components, including application software on the electronic eyewear device and mobile device, as well as examples of system operation, will be described with respect to FIGS. 7-16. Such software components include system software for placing markers (e.g., marker-endpoints), mobile device software for establishing and managing the object connections, and electronic eyewear device software for recognizing the markers (e.g., objects in a scene), for sending and receiving content, and for sharing the content with co-located users in a distributed session. However, it will be appreciated that the mobile device, the server, or both may be removed from the system provided the electronic eyewear device is configured to include sufficient processing and storage capabilities to perform the described functions of the mobile device, the server, or both.

Electronic Eyewear Device

In sample configurations, electronic eyewear devices with augmented reality (AR) capability are used in the systems described herein. Electronic eyewear devices are desirable to use in the system described herein as such devices are scalable, customizable to enable personalized experiences, enable effects to be applied anytime, anywhere, and ensure user privacy by enabling only the user to see the transmitted information. An electronic eyewear device such as SPEC- TACLES™ available from Snap, Inc. of Santa Monica, California, may be used without any specialized hardware in a sample configuration.

Figure 2A:
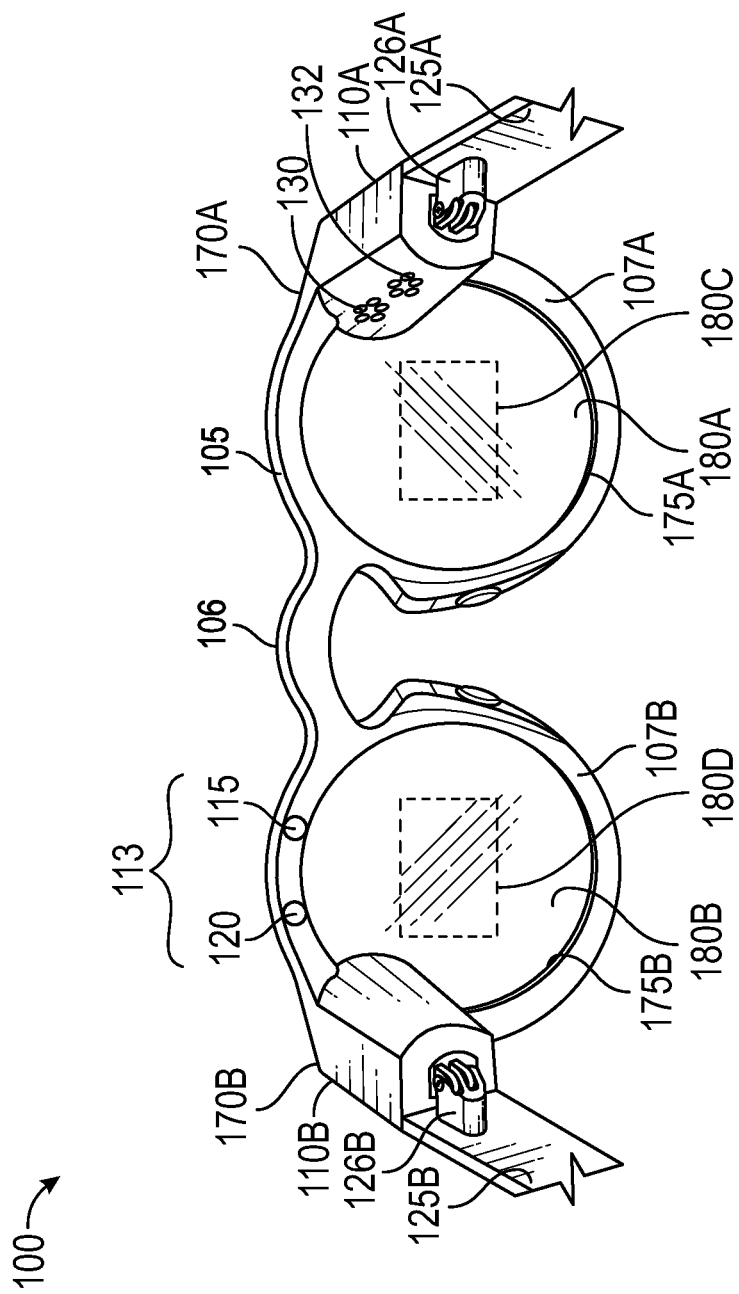
FIG. 2A is an illustration depicting a rear view of an example electronic eyewear device.

FIG. 1A is an illustration depicting a side view of an example hardware configuration of an electronic eyewear device 100 including an optical assembly 180A with an image display 180C (FIG. 2A). Electronic eyewear device 100 includes multiple visible light cameras 114A and 114B (FIG. 3) that form a stereo camera, of which the first visible light camera 114A is located on a right temple 110A and the second visible light camera 114B is located on a left temple 110B (FIG. 2A). In the illustrated example, the optical assembly 180A is located on the right side of the electronic eyewear device 100. The optical assembly 180A can be located on the left side or other locations of the electronic eyewear devices 100.

Figure 3:
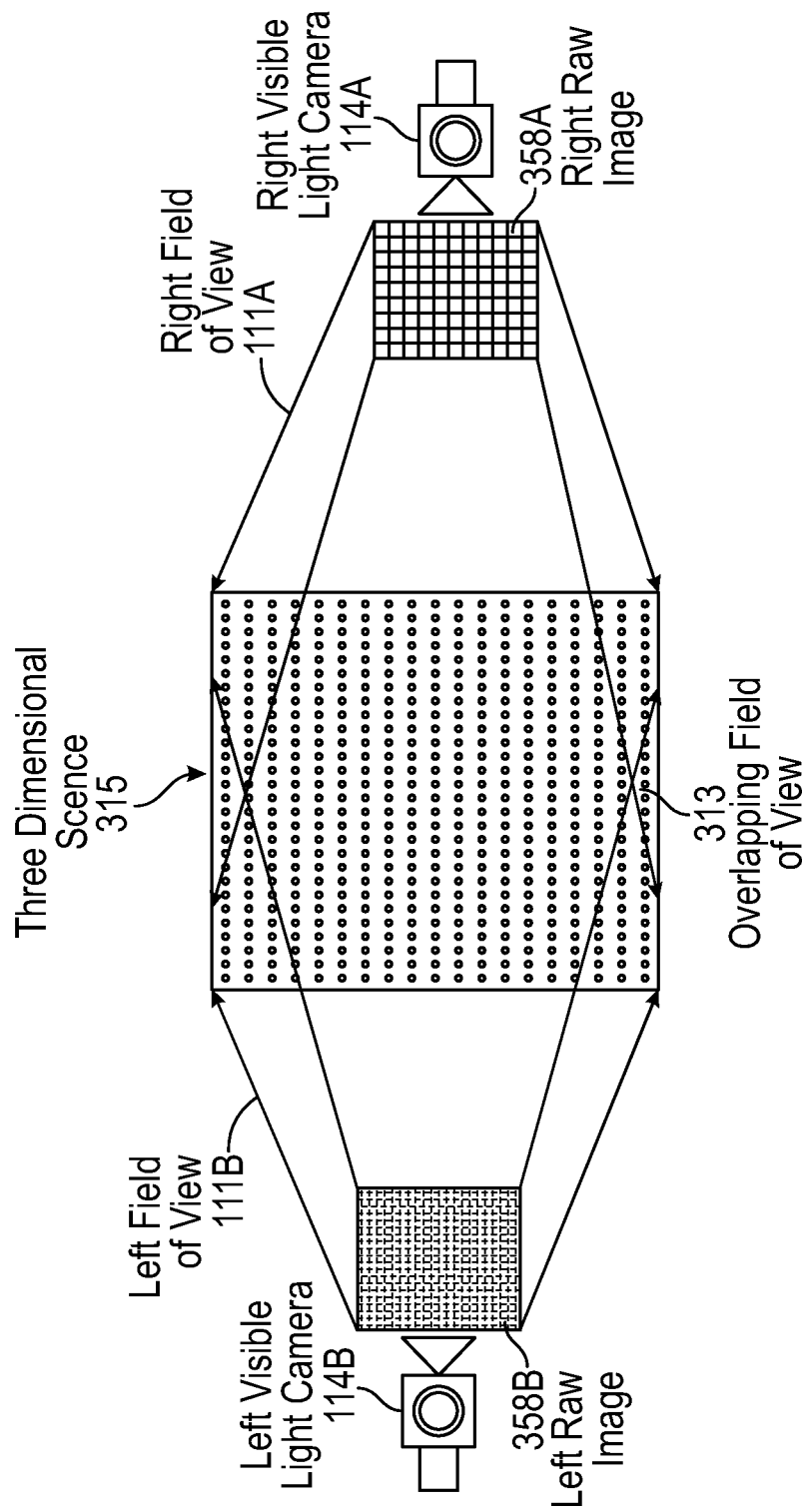
FIG. 3 is a block diagram illustrating an example of capturing visible light using an example electronic eyewear device illustrated in any of the proceeding figures.

The visible light cameras 114A and 114B may include an image sensor that is sensitive to the visible light range wavelength. Each of the visible light cameras 114A and 114B has a different frontward facing angle of coverage, for example, visible light camera 114A has the depicted angle of coverage 111A (FIG. 3). The angle of coverage is an angle range in which the respective image sensor of the visible light cameras 114A and 114B detects incoming light and generates image data. Examples of such visible lights cameras 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 114A and 114B may be captured along with geolocation data, digitized by an image processor, and stored in a memory.

To provide stereoscopic vision, visible light cameras 114A and 114B may be coupled to an image processor (element 412 of FIG. 4) for digital processing and adding a timestamp corresponding to the scene in which the image is captured. Image processor 412 may include circuitry to receive signals from the visible light cameras 114A and 114B and to process those signals from the visible light cameras 114A and 114B into a format suitable for storage in the memory (element 434 of FIG. 4). The timestamp may be added by the image processor 412 or other processor that controls operation of the visible light cameras 114A and 114B. Visible light cameras 114A and 114B allow the stereo camera to simulate human binocular vision. Stereo cameras also provide the ability to reproduce three-dimensional images of a three-dimensional scene (scene 315 of FIG. 3) based on two captured images (image pairs 358A and 358B of FIG. 3) from the visible light cameras 114A and 114B, respectively, having the same timestamp. Such three-dimensional images allow for an immersive virtual experience that feels realistic, e.g., for virtual reality or video gaming. For stereoscopic vision, the pair of images 358A and 358B may be generated at a given moment in time—one image for each of the visible light cameras 114A and 114B. When the pair of generated images 358A and 358B from the frontward facing field of view (FOV) 111A and 111B of the visible light cameras 114A and 114B are stitched together (e.g., by the image processor 412), depth perception is provided by the optical assemblies 180A and 180B.

In an example, the electronic eyewear device 100 includes a frame 105, a right rim 107A, a right temple 110A extending from a right lateral side 170A of the frame 105, and a see-through image display 180C (FIGS. 2A-B) comprising optical assembly 180A to present a GUI or other image to a user. The electronic eyewear device 100 includes the first visible light camera 114A connected to the frame 105 or the right temple 110A to capture a first image of the scene. Electronic eyewear device 100 further includes the second visible light camera 114B connected to the frame 105 or the left temple 110B to capture (e.g., simultaneously with the first visible light camera 114A) a second image of the scene which at least partially overlaps the first image. Although not shown in FIGS. 1A and 1B, a processor 432 (FIG. 4) is coupled to the electronic eyewear device 100 and is connected to the visible light cameras 114A and 114B and memory 434 (FIG. 4) accessible to the processor 432, and programming in the memory 434 may be provided in the electronic eyewear device 100 itself.

Figure 1B:
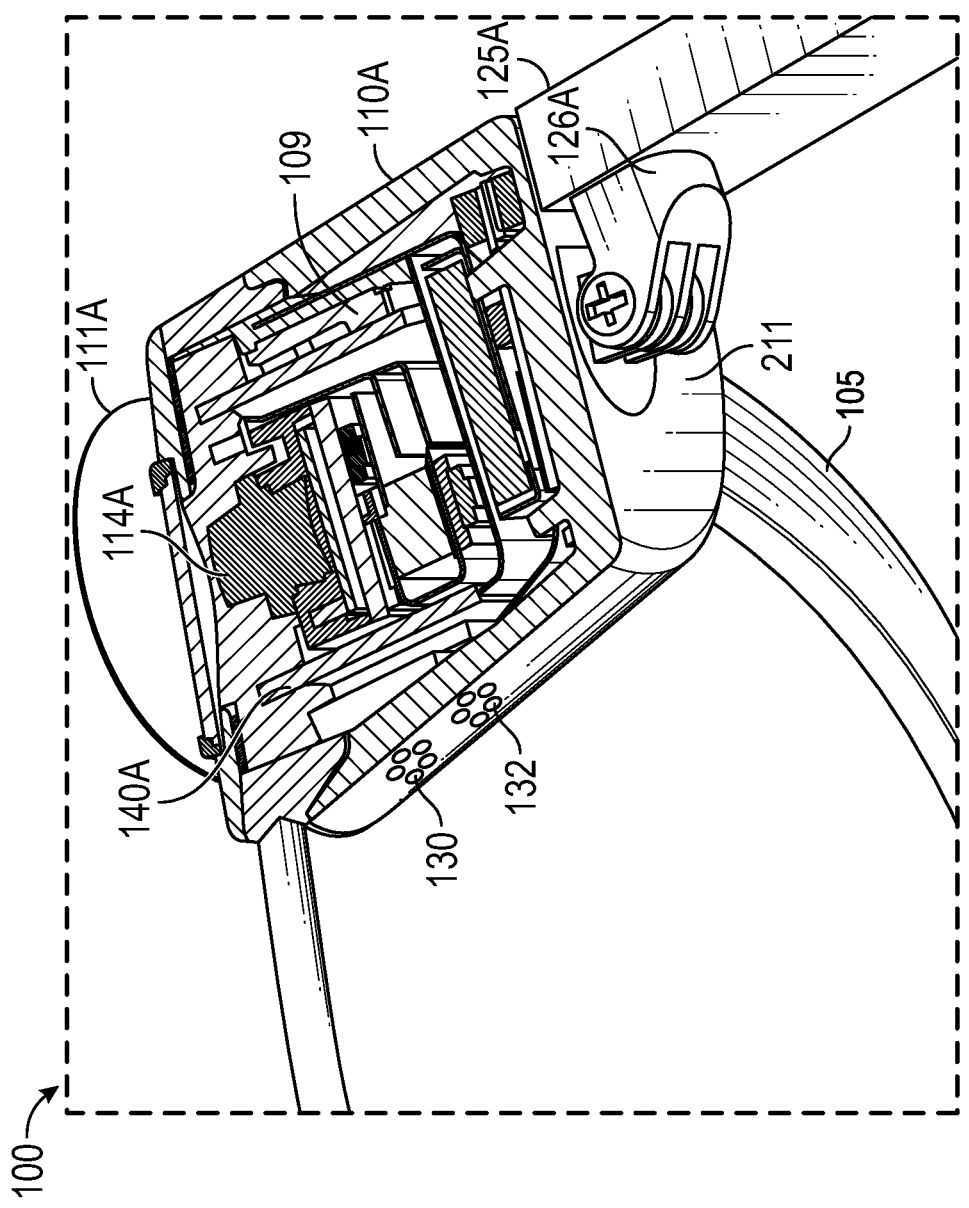
FIG. 1B is an illustration depicting a top cross-sectional view of optical components and electronics in a portion of the electronic eyewear device illustrated in FIG. 1A.
Figure 2B:
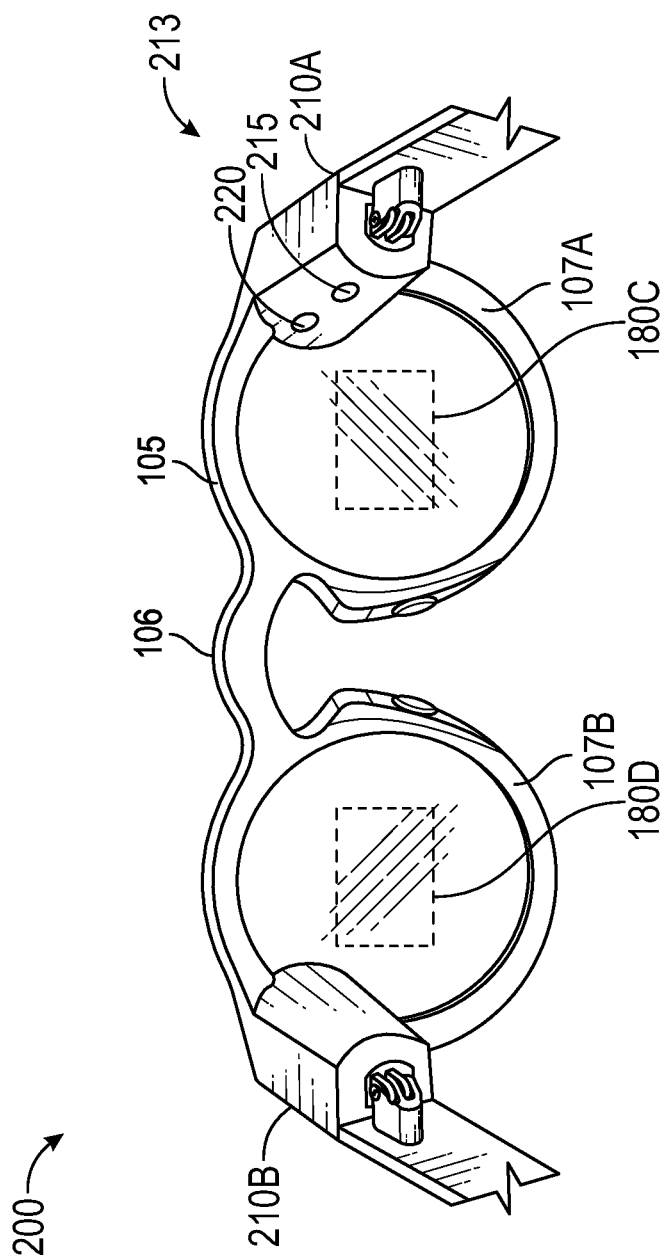
FIG. 2B is an illustration depicting a rear view of an example electronic eyewear device.
Figure 2C:
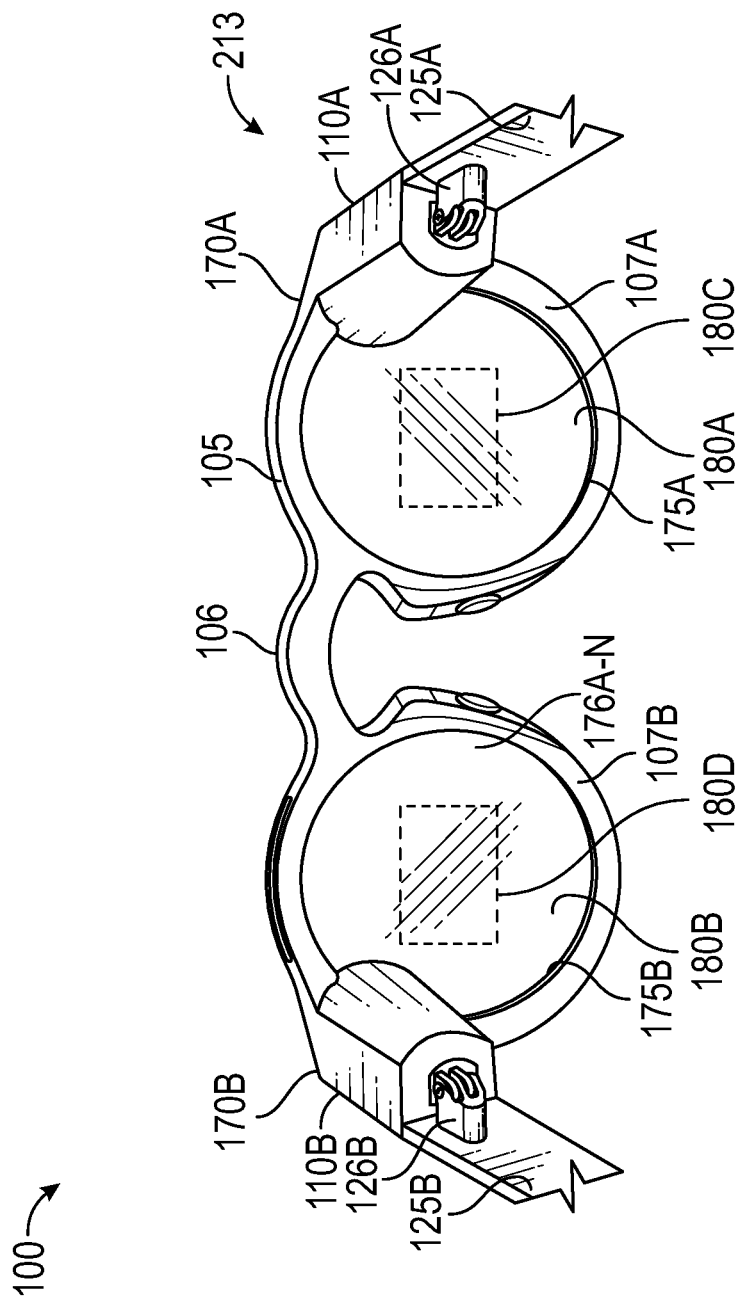
FIG. 2C is an illustration depicting a rear view of an example electronic eyewear device depicting an image display.

Although not shown in FIG. 1A, the electronic eyewear device 100 also may include a head movement tracker (element 109 of FIG. 1B) or an eye movement tracker (element 113 of FIG. 2A or element 213 of FIGS. 2B and 2C). Electronic eyewear device 100 may further include the see-through image displays 180C and D of optical assemblies 180A and 180B, respectively, for presenting a sequence of displayed images. The electronic eyewear devices 100 may further include an image display driver (element 442 of FIG. 4) coupled to the see-through image displays 180C and 180D to drive the image displays 180C and 180D. The see-through image displays 180C and 180D and the image display driver are described in further detail below. Electronic eyewear device 100 may further include the memory 434 and the processor 432 (FIG. 4) having access to the image display driver 442 and the memory 434, as well as programming in the memory 434. Execution of the programming by the processor 432 configures the electronic eyewear device 100 to perform functions, including functions to present, via the see-through image displays 180C and 180D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B and 2C), an eye movement of an eye of the user of the electronic eyewear device 100. Execution of the programming by the processor 432 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the electronic eyewear device 100 to generate successive displayed images of the sequence of displayed images based on the field of view adjustment. Execution of the programming by the processor 432 may further configure the electronic eyewear device 100 to present, via the see-through image displays 180C and 180D of the optical assemblies 180A and 180B, the successive displayed images.

FIG. 1B is an illustration depicting a top cross-sectional view of optical components and electronics in a portion of the electronic eyewear device 100 illustrated in FIG. 1A depicting the first visible light camera 114A, a head movement tracker 109, and a circuit board 140A. Construction and placement of the second visible light camera 114B is substantially similar to the first visible light camera 114A, except the connections and coupling are on the other lateral side 170B (FIG. 2A). As shown, the electronic eyewear device 100 includes the first visible light camera 114A and a circuit board, which may be a flexible printed circuit board (PCB) 140A. A first hinge 126A connects the right temple 110A to a hinged arm 125A of the electronic eyewear device 100. In some examples, components of the first visible light camera 114A, the flexible PCB 140A, or other electrical connectors or contacts may be located on the right temple 110A or the first hinge 126A.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the user's head. The head movement includes a variation of head direction on a horizontal axis, a vertical axis, or a combination thereof from the initial head direction during presentation of the initial displayed image on the image display. In one example, tracking, via the head movement tracker 109, the head movement of the user's head includes measuring, via the inertial measurement unit, the initial head direction on the horizontal axis (e.g., X axis), the vertical axis (e.g., Y axis), or the combination thereof (e.g., transverse or diagonal movement). Tracking, via the head movement tracker 109, the head movement of the user's head further includes measuring, via the inertial measurement unit, a successive head direction on the horizontal axis, the vertical axis, or the combination thereof during presentation of the initial displayed image.

Tracking, via the head movement tracker 109, the head movement of the user's head may include determining the variation of head direction based on both the initial head direction and the successive head direction. Detecting movement of the user of the electronic eyewear device 100 may further include in response to tracking, via the head movement tracker 109, the head movement of the user's head, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means ±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110A includes temple body 211 that is configured to receive a temple cap, with the temple cap omitted in the cross-section of FIG. 1B. Disposed inside the right temple 110A are various interconnected circuit boards, such as PCBs or flexible PCBs 140A, that include controller circuits for first visible light camera 114A, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The first visible light camera 114A is coupled to or disposed on the flexible PCB 140A and covered by a visible light camera cover lens, which is aimed through opening(s) formed in the right temple 110A. In some examples, the frame 105 connected to the right temple 110A includes the opening(s) for the visible light camera cover lens. The frame 105 may include a front-facing side configured to face outwards away from the eye of the user. The opening for the visible light camera cover lens may be formed on and through the front-facing side. In the example, the first visible light camera 114A has an outward facing angle of coverage 111A with a line of sight or perspective of the right eye of the user of the electronic eyewear device 100. The visible light camera cover lens also can be adhered to an outward facing surface of the right temple 110A in which an opening is formed with an outward facing angle of coverage, but in a different outwards direction. The coupling can also be indirect via intervening components.

The first visible light camera 114A may be connected to the first see-through image display 180C of the first optical assembly 180A to generate a first background scene of a first successive displayed image. The second visible light camera 114B may be connected to the second see-through image display 180D of the second optical assembly 180B to generate a second background scene of a second successive displayed image. The first background scene and the second background scene may partially overlap to present a three-dimensional observable area of the successive displayed image.

Flexible PCB 140A may be disposed inside the right temple 110A and coupled to one or more other components housed in the right temple 110A. Although shown as being formed on the circuit boards 140A of the right temple 110A, the first visible light camera 114A can be formed on another circuit board (not shown) in one of the left temple 110B, the hinged arm 125A, the hinged arm 125B, or the frame 105.

FIG. 2A is an illustration depicting a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the right rim 107A connected to the left rim 107B via the bridge 106, which is configured to receive a nose of the user. The right and left rims 107A and 107B include respective apertures 175A and 175B, which hold the respective optical elements 180A and 180B, such as a lens and the see-through displays 180C and 180D. As used herein, the term lens is meant to cover transparent or translucent pieces of glass or plastic having curved and flat surfaces that cause light to converge/diverge or that cause little or no convergence/divergence.

Although shown as having two optical elements 180A and 180B, the electronic eyewear device 100 can include other arrangements, such as a single optical element depending on the application or intended user of the electronic eyewear device 100. As further shown, electronic eyewear device 100 includes the right temple 110A adjacent the right lateral side 170A of the frame 105 and the left temple 110B adjacent the left lateral side 170B of the frame 105. The temples 110A and 110B may be integrated into the frame 105 on the respective sides 170A and 170B (as illustrated) or implemented as separate components attached to the frame 105 on the respective sides 170A and 170B. Alternatively, the temples 110A and 110B may be integrated into hinged arms 125A and 125B attached to the frame 105.

In the example of FIG. 2A, an eye scanner 113 is provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107B. The frame 105 or one or more of the temples 110A and 110B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107A, or in different locations on the frame 105. For example, the infrared emitter 115 may be on the left rim 107B and the infrared camera 120 may be on the right rim 107A. In another example, the infrared emitter 115 may be on the frame 105 and the infrared camera 120 may be on one of the temples 110A or 110B, or vice versa. The infrared emitter 115 can be connected essentially anywhere on the frame 105, right temple 110A, or left temple 110B to emit a pattern of infrared light. Similarly, the infrared camera 120 can be connected essentially anywhere on the frame 105, right temple 110A, or left temple 110B to capture at least one reflection variation in the emitted pattern of infrared light.

The infrared emitter 115 and infrared camera 120 may be arranged to face inwards towards an eye of the user with a partial or full field of view of the eye to identify the respective eye position and gaze direction. For example, the infrared emitter 115 and infrared camera 120 may be positioned directly in front of the eye, in the upper part of the frame 105 or in the temples 110A or 110B at either ends of the frame 105.

FIG. 2B is an illustration depicting a rear view of an example hardware configuration of another electronic eyewear device 200. In this example configuration, the electronic eyewear device 200 is depicted as including an eye scanner 213 on a right temple 210A. As shown, an infrared emitter 215 and an infrared camera 220 are co-located on the right temple 210A. The eye scanner 213 or one or more components of the eye scanner 213 can be located on the left temple 210B and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a right rim 107A which is connected to a left rim 107B via a bridge 106. The rims 107A-B may include respective apertures which hold the respective optical elements 180A and 180B comprising the see-through displays 180C and 180D.

Figure 2D:
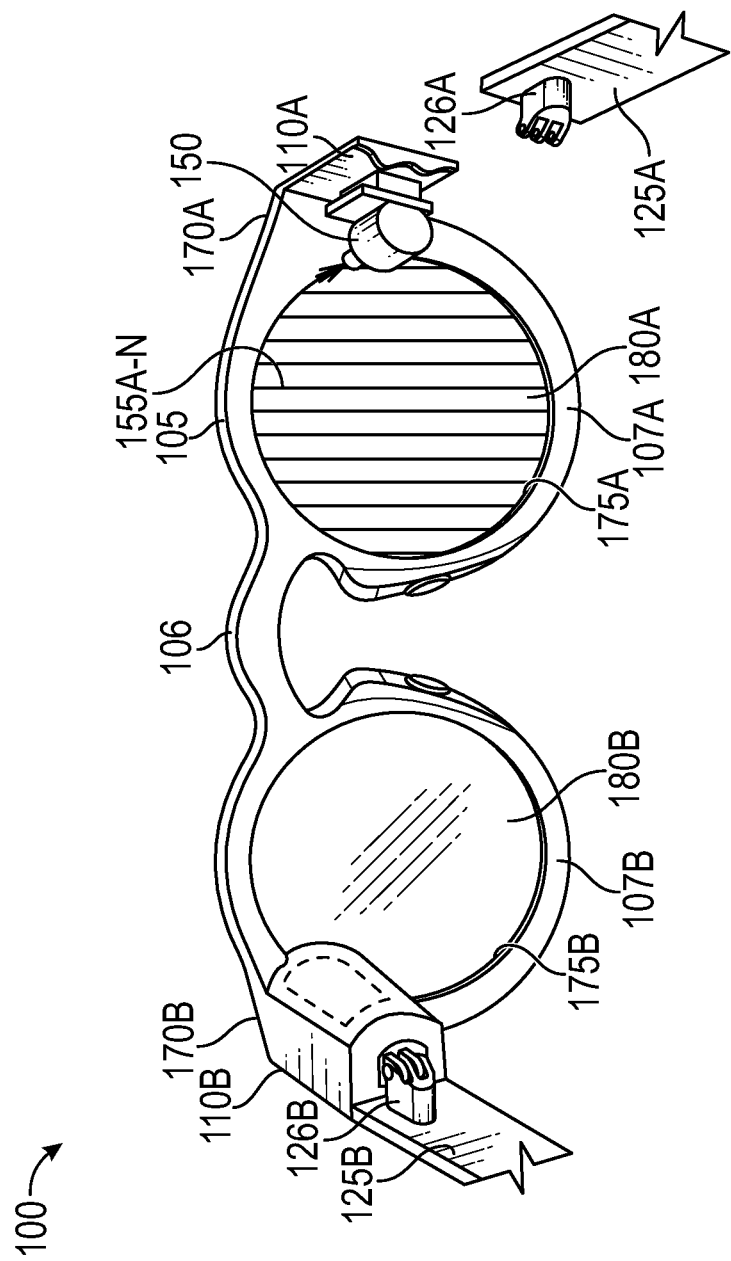
FIG. 2D is an illustration depicting a rear view of an example electronic eyewear device depicting an image display.

FIG. 2C and FIG. 2D are illustrations depicting rear views of example hardware configurations of the electronic eyewear device 100, including two different types of see-through image displays 180C and 180D. In one example, these see-through image displays 180C and 180D of optical assemblies 180A and 180B include an integrated image display. As shown in FIG. 2C, the optical assemblies 180A and 180B include a display matrix 180C and 180D of any suitable type, such as a liquid crystal display (LCD), an organic light-emitting diode (OLED) display, a waveguide display, or any other such display.

The optical assemblies 180A and 180B also includes an optical layer or layers 176A-N, which can include lenses, optical coatings, prisms, mirrors, waveguides, optical strips, and other optical components in any combination. The optical layers 176 can include a prism having a suitable size and configuration and including a first surface for receiving light from display matrix and a second surface for emitting light to the eye of the user. The prism of the optical layers 176 may extend over all or at least a portion of the respective apertures 175A and 175B formed in the rims 107A and 107B to permit the user to see the second surface of the prism when the eye of the user is viewing through the corresponding rims 107A and 107B. The first surface of the prism of the optical layers 176 faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176. In this regard, the second surface of the prism of the optical layers 176 can be convex to direct the light towards the center of the eye. The prism can be sized and shaped to magnify the image projected by the see-through image displays 180C and 180D, and the light travels through the prism so that the image viewed from the second surface is larger in one or more dimensions than the image emitted from the see-through image displays 180C and 180D.

In another example, the see-through image displays 180C and 180D of optical assemblies 180A and 180B may include a projection image display as shown in FIG. 2D. The optical assemblies 180A and 180B include a projector 150, which may be a three-color projector using a scanning mirror, a galvanometer, a laser projector, or other types of projectors. During operation, an optical source such as a projector 150 is disposed in or on one of the temples 110A or 110B of the electronic eyewear device 100. Optical assemblies 180A and 180B may include one or more optical strips 155A-N spaced apart across the width of the lens of the optical assemblies 180A and 180B or across a depth of the lens between the front surface and the rear surface of the lens.

As the photons projected by the projector 150 travel across the lens of the optical assemblies 180A and 180B, the photons encounter the optical strips 155. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls the optical strips 155 by initiating mechanical, acoustic, or electromagnetic signals. Although shown as having two optical assemblies 180A and 180B, the electronic eyewear device 100 can include other arrangements, such as a single or three optical assemblies, or the optical assemblies 180A and 180B may have different arrangements depending on the application or intended user of the electronic eyewear device 100.

As further shown in FIG. 2C and FIG. 2D, electronic eyewear device 100 includes a right temple 110A adjacent the right lateral side 170A of the frame 105 and a left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective sides 170A and 170B. Alternatively, the temples 110A and 110B may be integrated into the hinged arms 125A and 125B attached to the frame 105.

In one example, the see-through image displays include the first see-through image display 180C and the second see-through image display 180D. Electronic eyewear device 100 may include first and second apertures 175A and 175B that hold the respective first and second optical assemblies 180A and 180B. The first optical assembly 180A may include the first see-through image display 180C (e.g., a display matrix, or optical strips and a projector in the right temple 110A). The second optical assembly 180B may include the second see-through image display 180D (e.g., a display matrix, or optical strips and a projector 150B (shown as projector 150) in right temple 110A). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the image displays 180C and 180D of optical assemblies 180A and 180B. The "angle of coverage" describes the angle range that a lens of visible light cameras 114A or 114B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the image displays 180C and 180D of the optical assemblies 180A and 180B. Image display 180C of optical assemblies 180A and 180B can have a field of view with an angle of coverage between 15° to 30°, for example 24°, and have a resolution of 480×480 pixels (or greater; e.g., 720p, 1080p, 4K, or 8K).

Figure 4:
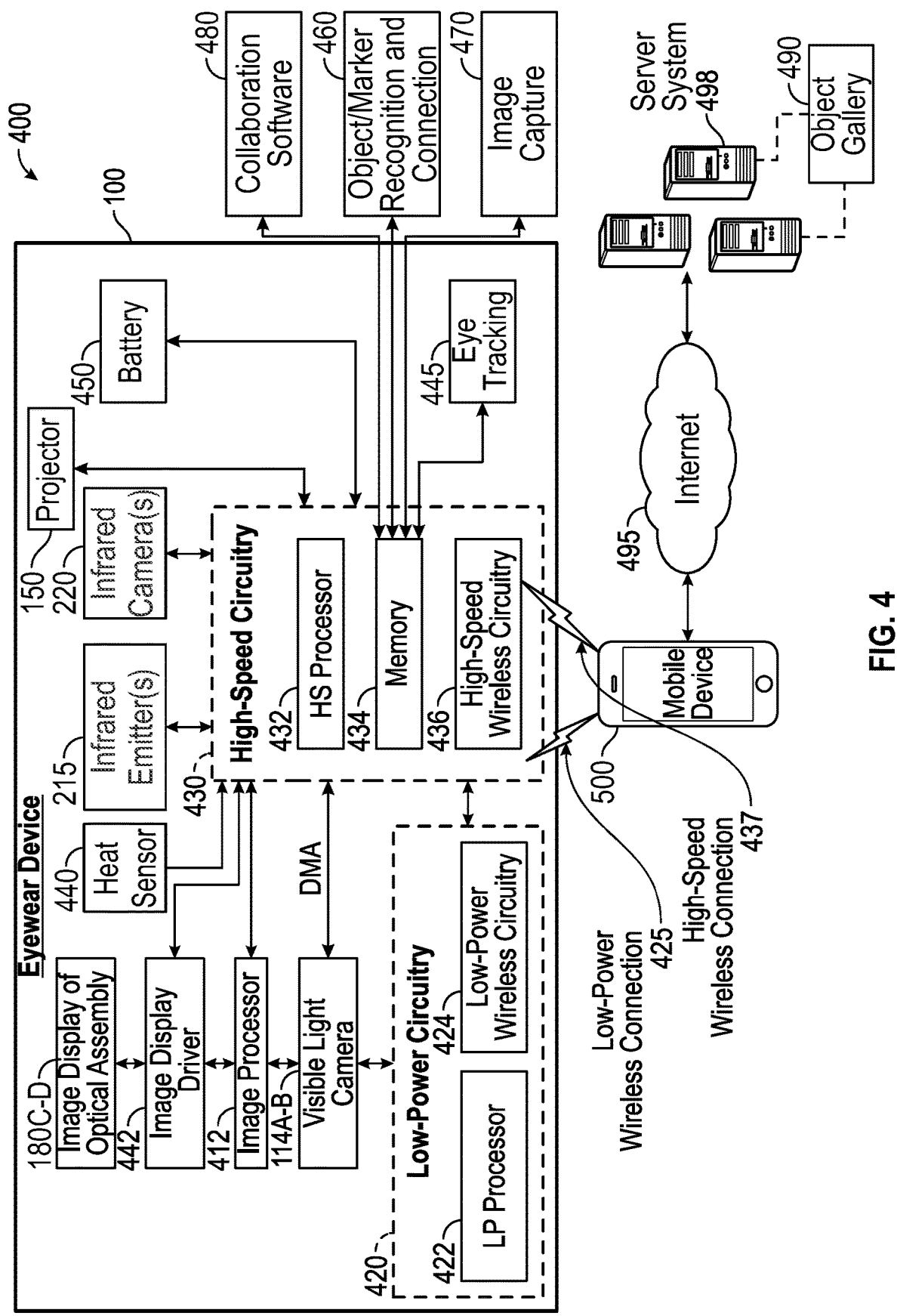
FIG. 4 is a system block diagram of an example electronic eyewear device.

The block diagram in FIG. 3 illustrates an example of capturing visible light with cameras 114A and 114B. Visible light is captured by the first visible light camera 114A with a round field of view (FOV) 111A. A chosen rectangular first raw image 358A is used for image processing by image processor 412 (FIG. 4). Visible light is also captured by the second visible light camera 114B with a round FOV 111B. A rectangular second raw image 358B chosen by the image processor 412 is used for image processing by processor 412. The raw images 358A and 358B have an overlapping field of view 313. The processor 412 processes the raw images 358A and 358B and generates a three-dimensional image 315 for display by the displays 180C and 180D. The three-dimensional image 315 is also referred to hereafter as an immersive image.

The system block diagram in FIG. 4 illustrates a high-level functional block diagram including example electronic components disposed in electronic eyewear device 100 or 200, including components for sharing AR objects with co-located users in sample configurations. The illustrated electronic components include the processor 432, the memory 434, and the see-through image displays 180C and 180D.

Memory 434 includes instructions for execution by processor 432 to implement the functionality of electronic eyewear devices 100 and 200, including instructions for high-speed processor 432 to control the image 315. Such functionality may be implemented by processing instructions of eye tracking programming 445, object/marker recognition and connection software 460, image capture software 470, and collaboration software 480 that is stored in memory 434 and executed by high-speed processor 432. High speed processor 432 receives power from battery 450 and executes the instructions stored in memory 434. The memory 434 may be a separate component, or memory 434 may be integrated with the processor 432 "on-chip" to perform the functionality of electronic eyewear devices 100 and 200 and to communicate with external devices via wireless connections.

The electronic eyewear devices 100 and 200 may incorporate eye movement tracking programming 445 (e.g., implemented using infrared emitter 215 and infrared camera 220 in FIG. 2B) and may provide user interface adjustments via a mobile device 500 (FIG. 5) and a server system 498 connected via various networks. Mobile device 500 may be a smartphone, tablet, laptop computer, access point, or any other such device capable of connecting with the electronic eyewear devices 100 or 200 using both a low-power wireless connection 425 and a high-speed wireless connection 437. Mobile device 500 is further connected to server system 498 via a network 495. The network 495 may include any combination of wired and wireless connections.

Electronic eyewear devices 100 and 200 may include image display driver 442, image processor 412, low-power circuitry 420, and high-speed circuitry 430. The components shown in FIG. 4 for the electronic eyewear devices 100 and 200 are located on one or more circuit boards, for example, a PCB or flexible PCB 140A and 140B, in the temples. Alternatively, or additionally, the depicted components can be located in the temples, frames, hinges, hinged arms, or bridge of the electronic eyewear devices 100 and 200. The visible light cameras 114A and 114B can include digital camera elements such as a complementary metal—oxide—semiconductor (CMOS) image sensor, charge coupled device, a lens, or any other respective visible or light capturing elements that may be used to capture data, including images of scenes with unknown objects.

Eye movement tracking programming 445 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C and 180D of optical assemblies 180A and 180B, which is driven by image display driver 442 to present the sequence of displayed images, including the initial displayed image with the initial field of view and the successive displayed image with the successive field of view.

The object/marker recognition and connection programming 460, image capture programming 470, and collaboration programming 480 will be described in further detail below in connection with FIGS. 7-16.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the image displays 180C and 180D of the optical assemblies 180A and 180B. High-speed processor 432 may be any processor capable of managing high-speed communications and operation of any general computing system needed for electronic eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the electronic eyewear device 100 or 200 and the operating system is stored in memory 434 for execution. In addition to any other responsibilities, the high-speed processor 432 executing a software architecture for the electronic eyewear device 100 or 200 is used to manage data transfers with high-speed wireless circuitry 436. In certain examples, high-speed wireless circuitry 436 is configured to implement wireless communication protocols such as Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the electronic eyewear devices 100 and 200 can include short range transceivers (BLUETOOTH®) and wireless wide, local, or wide area network transceivers (e.g., cellular or WI-FI®). Mobile device 500, including the transceivers communicating via the low-power wireless connection 425 and high-speed wireless connection 437, may be implemented using details of the architecture of the electronic eyewear device 100 and 200, as can other elements of network 495.

Memory 434 includes any storage device capable of storing various data and applications, including, among other things, color maps, camera data generated by the visible light cameras 114A-B and the image processor 412, as well as images generated for display by the image display driver 442 on the see-through image displays 180C and 180D of the optical assemblies 180A and 180B. While memory 434 is shown as integrated with high-speed circuitry 430, in other examples, memory 434 may be an independent standalone element of the electronic eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Server system 498 may be one or more computing devices as part of a service or network computing system, for example, which includes a processor, a memory, and network communication interface to communicate over the network 495 with the mobile device 500 and electronic eyewear devices 100 and 200. Electronic eyewear devices 100 and 200 may be connected with a host computer. For example, the electronic eyewear devices 100 or 200 may be paired with the mobile device 500 via the high-speed wireless connection 437 or connected to the server system 498 via the network 495. Also, as explained in more detail below, a gallery 490 of snapshots and AR objects may be maintained by the server system 498 for each user and invoked by communications providing links to the stored snapshots and AR objects in gallery 490.

Output components of the electronic eyewear devices 100 and 200 include visual components, such as the image displays 180C and 180D of optical assemblies 180A and 180B as described in FIGS. 2C and 2D (e.g., a display such as a liquid crystal display (LCD), a plasma display panel (PDP), a light emitting diode (LED) display, a projector, or a waveguide). The image displays 180C and 180D of the optical assemblies 180A and 180B are driven by the image display driver 442. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 500, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may include additional peripheral device elements such as ambient light and spectral sensors, biometric sensors, heat sensor 440, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 500 via the low-power wireless circuitry 424 or high-speed wireless circuitry 436.

Mobile Device

Figure 5:
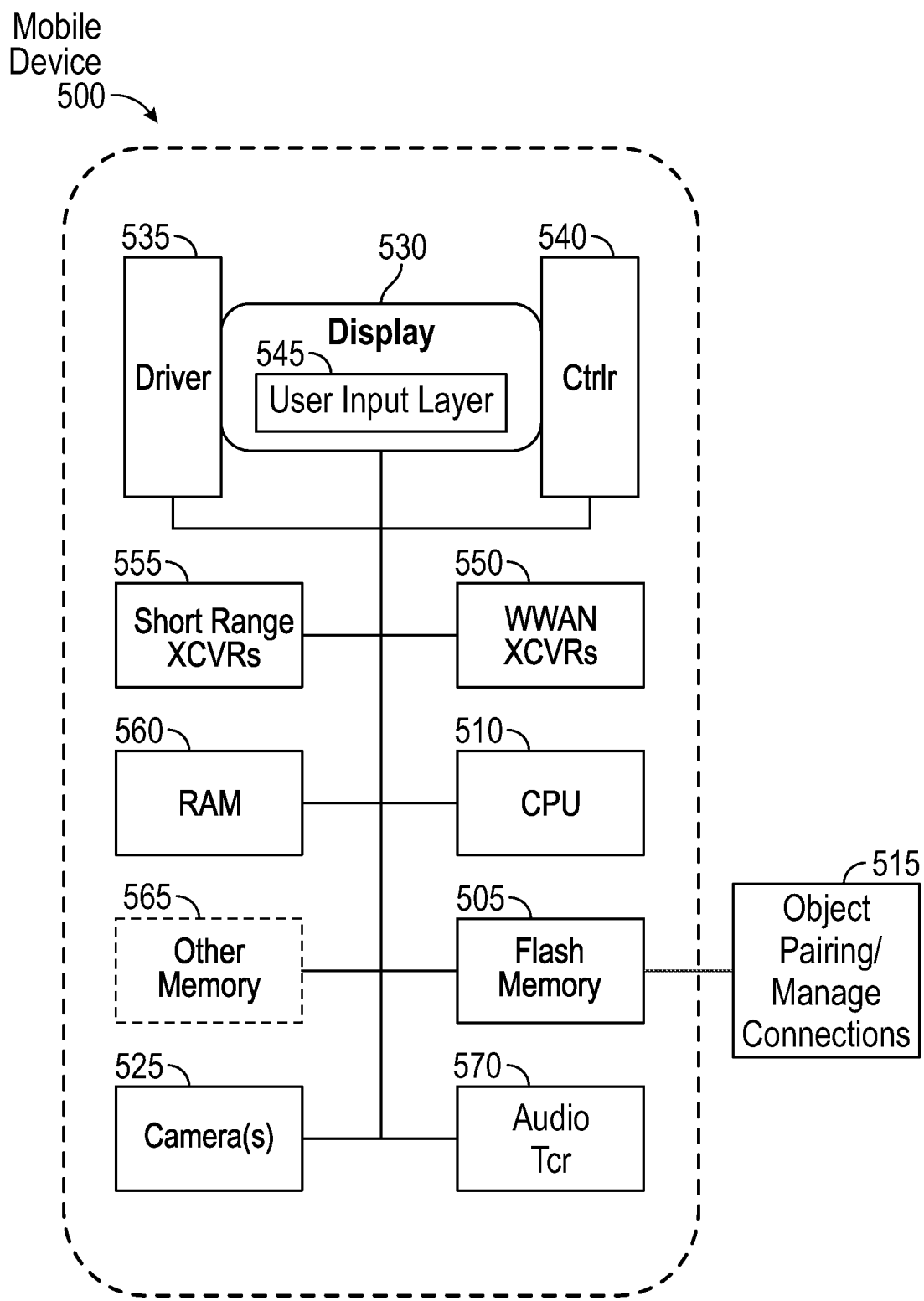
FIG. 5 is a block diagram of electronic components of a mobile device configured for use with the system of FIG. 4.

FIG. 5 is a block diagram depicting a sample configuration of a mobile device 500 for use with the system of FIG. 4 for managing social connections via objects. FIG. 5 is a high-level functional block diagram of an example mobile device 500 that a user may use to manage social connections via objects as described herein. Mobile device 500 may include a flash memory 505 that stores programming to be executed by the CPU 510 to perform all or a subset of the functions described herein. For example, the flash memory may store object pairing and connection management software 515 for execution by CPU 510 to enable the user of the mobile device 500 to establish objects as markers and to manage connections as described herein with respect to FIG. 5. The mobile device 500 may further include a camera 525 that comprises one or more visible-light cameras (first and second visible-light cameras with overlapping fields of view) or at least one visible-light camera and a depth sensor with substantially overlapping fields of view. Flash memory 505 may further include multiple images or video, which are generated via the camera 525.

The mobile device 500 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 500 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 500 includes at least one digital transceiver (XCVR) 550, shown as WWAN (Wireless Wide Area Network) XCVRs, for digital wireless communications via a wide-area wireless mobile communication network. The mobile device 500 also may include additional digital or analog transceivers, such as short-range transceivers (XCVRs) 555 for short-range network communication, such as via NFC, VLC, DECT, ZigBee, BLUETOOTH®, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 500, the mobile device 500 also may include a global positioning system (GPS) receiver. Alternatively, or additionally, the mobile device 500 may utilize either or both the short range XCVRs 555 and WWAN XCVRs 550 for generating location coordinates for positioning. For example, cellular network, WI-FI®, or BLUETOOTH® based positioning systems may generate very accurate location coordinates, particularly when used in combination. Such location coordinates may be transmitted to the mobile device 500 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 500.

The mobile device 500 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smartphone, laptop computer, and tablet.

The CPU 510 serves as a programmable host controller for the mobile device 500 by configuring the mobile device 500 to perform various operations, for example, in accordance with instructions or programming executable by CPU 510. For example, such operations may include various general operations of the mobile device 500, as well as operations related to the programming for messaging apps and AR camera applications on the mobile device 500. Although a processor may be configured by use of hardwired logic, typical processors in mobile devices are general processing circuits configured by execution of programming.

The mobile device 500 further includes a memory or storage system, for storing programming and data. In the example shown in FIG. 5, the memory system may include flash memory 505, a random-access memory (RAM) 560, and other memory components 565, as needed. The RAM 560 may serve as short-term storage for instructions and data being handled by the CPU 510, e.g., as a working data processing memory. The flash memory 505 typically provides longer-term storage.

Hence, in the example of mobile device 500, the flash memory 505 may be used to store programming or instructions for execution by the CPU 510. Depending on the type of device, the mobile device 500 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

Finally, the mobile device 500 may include an audio transceiver 570 that may receive audio signals from the environment via a microphone (not shown) and provide audio output via a speaker (not shown). Audio signals may be coupled with video signals and other messages by a messaging application or social media application implemented on the mobile device 500.

Server System

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Figure 6:
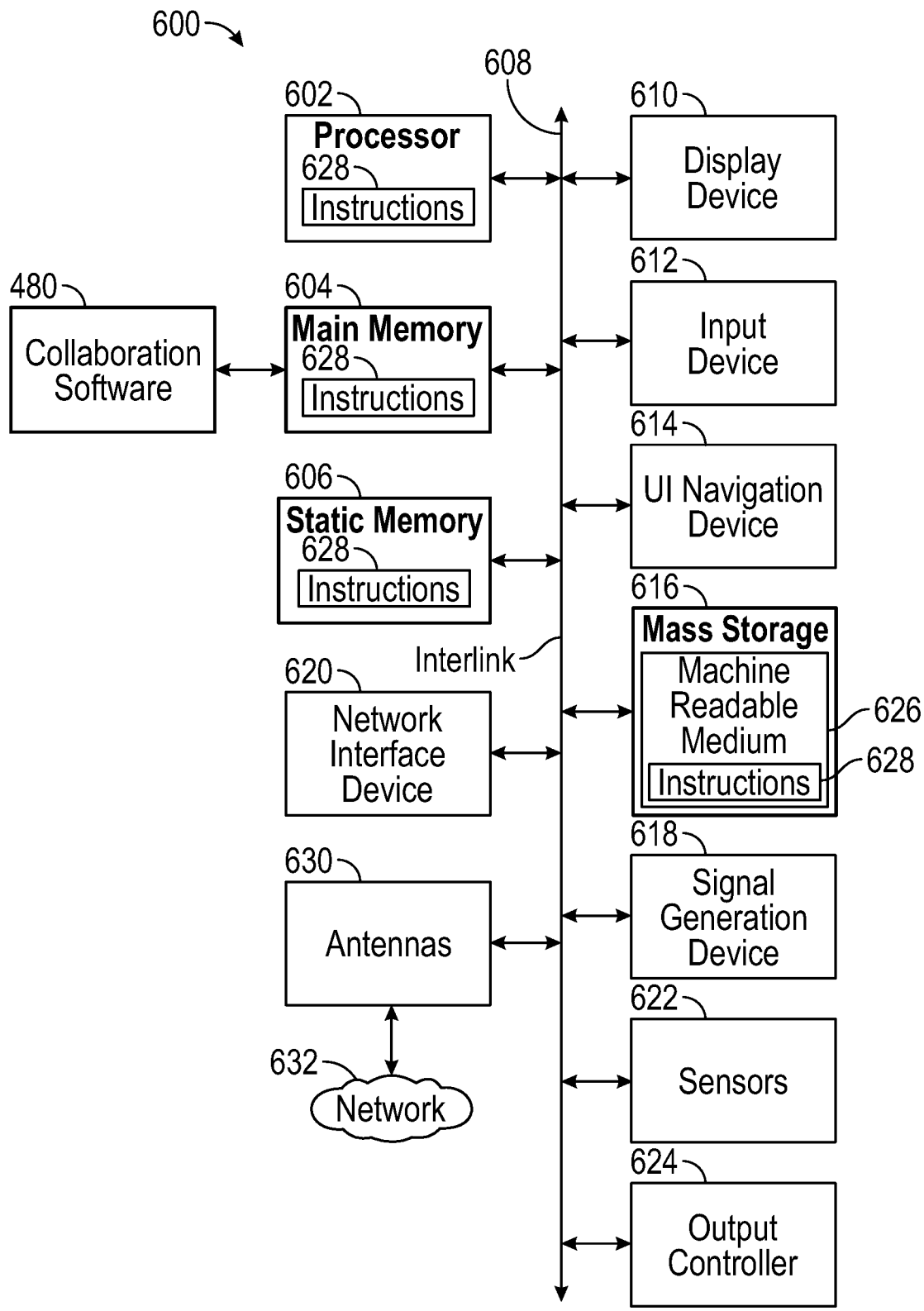
FIG. 6 is a block diagram of a sample back-end server system of the type illustrated in FIG. 4.

The block diagram in FIG. 6 illustrates a computer system for implementation processing elements such as the back-end server system illustrated in FIG. 4. FIG. 6 is a block diagram of a sample machine 600 upon which one or more configurations of a sample back-end server system 498 of the type illustrated in FIG. 4 may be implemented. As described herein, the server system 498 may execute instructions for connecting the IDs, images, and descriptions of respective marker-endpoint objects or user-endpoint objects. The server system 498 also may store representations of objects including communications of AR generated objects (e.g., computer-generated objects such as sparkles) user-generated objects (e.g., snapshot of a real-world object such as a coffee mug or 3D scan of a shoe), or both received from a remote user for transmission to another user upon receipt of an indication that the other user is a user-endpoint or has viewed the user's corresponding marker-endpoint with the user's electronic eyewear device. The server system 498 may also maintain a gallery 490 of user snapshots of real-world objects and AR objects as well as collaboration software 480 for enabling respective users to share views of a shared AR object. In alternative configurations, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment.

In sample configurations, the machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as a workstation, a front-end server, or a back-end server of a communication system. Machine 600 may implement the methods described herein by running the software used to implement the features for sharing AR objects as described herein. Further, while only a single machine 600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 also may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine-readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine-readable media.

While the machine-readable medium 626 is illustrated as a single medium, the term "machine-readable medium" may include a single medium or multiple media (e.g., at least one of a centralized or distributed database, or associated caches and servers) configured to store the one or more instructions 628. The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and Digital Video Disks (DVD)-ROM disks. In some examples, machine-readable media may include non-transitory machine-readable media. In some examples, machine-readable media may include machine-readable media that is not a transitory propagating signal.

The instructions 628 may further be transmitted or received over communications network 632 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 632. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API (Application Programming Interface) calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Sharing AR Objects with Co-Located Users

To implement the functionality for sharing AR objects with co-located users as described herein, two software applications are implemented on the hardware described above. One application runs on the mobile device 500 (iPhone/Android) and one runs on the electronic eyewear device 100. Both users in a pair may use both applications to implement the functionality. Although the users may be "friends" in the context of a messaging application, it is contemplated that the system may be used with any users of the software applications whether or not such users have a pre-existing connection or relationship. As used herein, "co-located users" are users of the same software application that are either located at the same physical location or at the same virtual location in a virtual world.

In a sample configuration, the mobile device application 515 is installed on a mobile device 500 by each user by, for example, scanning a Snap Code available from Snap, Inc. of Santa Monica, California. Each user logs into the mobile device application 515 with their login information. Once the user is signed in and has identified their user data (i.e., a Pair ID and a user assignment, User A or User B), the user can place markers and take photos of their locations to be stored in the mobile device application. Once a pair of corresponding markers has been set up by each user, respectively, a connection is established between them through which object exchanges can occur. For each user, the user's electronic eyewear device 100 is paired to the mobile device applications to leverage this connection information.

The electronic eyewear device application 460 is installed on the user's electronic eyewear device 100 and allows each user to experience (e.g., view, listen, maneuver, touch, etc.) the content received from a user at a different physical or virtual location ("remote user"). An electronic eyewear device 100 including the electronic eyewear device application 460 detects the user's physical markers and loads auditory and visual content from the remote user for the user to experience. In the examples described herein, two forms of objects may be sent: 1) AR content, and 2) real-world content including selected snapshots or video content with or without a recorded audio snippet which is extracted from the real-world environment.

The system so configured enables remote users to interact with one another while wearing augmented reality (AR) electronic eyewear devices 100 by establishing objects as personalized anchor points for social connection. The system allows users to place physical markers on various objects that they use or come across in their daily lives. The physical markers are a proxy to actual object detection and may be generated continuously. Using the associated mobile device application 515, the user may establish connections between their physical markers and a remote user's set of physical markers. The connections can be symmetric connections (e.g., lamp to lamp) or asymmetric connections (e.g., lamp-to-mug). Once set, an electronic eyewear device 100 running the electronic eyewear device application 460 may detect the previously established physical marker when the physical marker is in the field of view of the electronic eyewear device 100, thereby triggering AR content (visual and auditory content) to be projected for the user based on the remote user's activities. The AR content is placed at the remote user's corresponding marker location (marker-endpoint). In addition, one user may actively select an object (e.g., an AR object, or user-generated scan of a real-world object) to send to another user via the connection between the physical markers, or the user may send the object directly to the other user through a messaging system such as SNAPCHAT®, available from Snap, Inc., of Santa Monica, California.

In sample configurations, the duration of time in which the marker is in the user's field of view determines what content is placed for the remote user. A time-buffer is used to track the duration of time in which the marker is in the field of view. A preestablished short period of time (e.g., <1 second) triggers the placement of predetermined AR content, such as a sparkle-like effect, at the remote user's marker-endpoint, while a longer period of time (e.g., ≥1 second) triggers the electronic eyewear device to clone content from the user's real-world surroundings or to select predetermined AR content or predetermined user-generated scan of a real-world object, as well as to record audio for a short duration of time (e.g., 5 seconds). The field of view is determined using, for example, the eye tracker 213 described above with respect to FIG. 2B and the eye tracking programming 445 described above with respect to FIG. 4 to determine the user's gaze direction. The systems and methods described herein thus allow users to interact with and share their state with other users by looking at objects having pre-set physical markers around them. The physical markers may be fixed objects in the user's surroundings but may also be movable objects such as people, faces, pets, or vehicles. A user may send a passive, hands-free message by looking at (scanning) a particular object or marker. The user's gaze is tracked to identify an object or marker in the user's gaze, and an object is sent that is indicative of the user's state. Using the system, a user can send messages from one object to another, or, when another user is a marker, from an object to the other user directly, anywhere the other user may be located. Once a series of objects with marker-endpoints are set up, a user can walk in their home or outdoors, go through their routine, and by looking at the marker-endpoints, the system will notify other users (e.g., their "friends" in a messaging application) of their activities and actions based on the objects received in response to the user's gaze at marker-endpoints in the user's environment. In sample configurations, a user looking at a marker-endpoint object triggers the system to send a default AR content (e.g., sparkles) to the receiver at a specific location or anywhere to which the marker-endpoint object has been connected. Conversely, when the system detects that a user is looking at a marker-endpoint object, the system can recommend relevant AR content, for utilitarian or expressive purposes, that the user may use to send to other users. For example, a user of the electronic eyewear device 100 may scan a scene and the system may recommend AR content including, for example, a set of AR Lenses of the type available from Snap, Inc. of Santa Monica, California, that the user can select and send to another user as an AR overlay (i.e., digital content, images, information, or a combination thereof generated for presentation over the physical world on an AR display).

In the case where a face is used as a marker, the system may trigger messages to be sent when the system detects that the user is looking at the face. For example, if a user selects Suni Lee's face as a marker, every time the user watches her perform, the system notifies other users (e.g., the user's "friends" in a messaging application). The "friend" would thus be informed by the system that the user is watching gymnastics right now. Similarly, if a user selects the face of an acquaintance, any time they see their acquaintance, the system may trigger a message to be sent to other users indicating that both acquaintances are together.

The system also may support transient and persistent AR. Depending on the setting, the AR content on the receiver side can accumulate and build up (persistent) or fade away after viewing (transient). As time passes, the AR content's color, brightness, or both may fade away as well to indicate how long ago the user performed an activity.

The system enables a user to generate a clone of a real-world object and to share it with other users to indicate their state or context—as if that object was in the other user's space. For example, the user may provide a snapshot of a mug. If the user selects the mug as a marker, then every time the user looks at or scans the mug, a snapshot of the mug is generated and sent to another connected user as a realistic AR mug. Additionally, several snapshots of the mug with different amounts of coffee may be provided and selected from to indicate the type and the level of coffee remaining in the mug by synchronizing the state between the real mug and an AR mug. On the other hand, a user may scan an object such as a flower while taking a walk and place the flower at another user's desk established as a marker-endpoint, remotely in AR, to indicate that the user is taking a walk. Similarly, the user may send a snapshot of a new dress to the marker-endpoint to indicate that she is shopping.

Users may generate a gallery 490 (FIG. 4) of 3D snapshots, private or public, that the users can use to indicate their state or mood. The object gallery 490 may provide a significant repository of realistic AR content that is invoked via communication links that enable access by users via their electronic eyewear devices 100. Also, a marketplace for objects may be provided through which objects can be bought/rented/leased. In addition to individual users, businesses can generate snapshots of the food or artifacts that a user can access via a map. In this case, users may scan AR objects that are presented as virtual objects on the map. Restaurants can scan the food before it is sent, and people can see the food that is to be delivered to them as it moves on a virtual map. Users may scan a place to generate a virtual place on the map that represents the real-life one.

In further sample configurations, a first remote user may send a 3D object to a second user via a messaging application (such as a chat in SNAPCHAT®, available from Snap, Inc., of Santa Monica, California). In this example, the second user may receive a push notification indicating that they have received a new 3D AR object from the first user. The received 3D AR object may be associated with a marker (e.g., a table in the room with the second user) or may be sent as an attachment to a chat message sent to the second user. The second user may then elect to share the received 3D AR object with other persons co-located with the second user. For example, if the second user is sitting around a table including a marker with other users, the second user may initiate a share session with the other users so that the other users may also view and interact with the 3D AR object received from the first user. The other users may or may not be "friends" in the context of the messaging application as the other users may be persons within range of local communications such as BLUETOOTH®, WI-FI®, AIR-DROP®, etc. In sample configurations, the messaging application may include a feature that establishes which "friends" in the context of a messaging application are nearby (within a few feet) whereby the second user may selectively contact the identified "friends" to establish a communication session for sharing the received 3D AR object.

In a specific example, the 3D AR object may be a 3D scan of shoes that the first user is thinking of buying. The first user may send the 3D scan of shoes to a specific marker as described above or may send the 3D scan of shoes as an attachment to a chat message that asks, for example: "What do you think of these shoes?" The second user may interact with the received 3D scan of shoes to spin the shoes around to view from different angles. The second user also may establish a collaboration session to share the 3D scan of shoes with other co-located users. In such a case, the other co-located users may also see the 3D scan of the shoes as well as the spin of the 3D scan of the shoes by the second user. The other users also may annotate the 3D scan of shoes via the collaboration session. For example, one of the co-located users may attach a note to the shoelaces "Shoelaces would look better in blue" while another co-located user may add a yellow AR overlay to the shoes (making the shoes appear to be yellow) along with a note "See if they have them in yellow!" The modified 3D scan of shoes then may be sent back to the first user with the attached notes and yellow AR overlay.

Operation of the systems and methods for implementing these features will become apparent from the following illustrative operational examples.

Figure 7B:
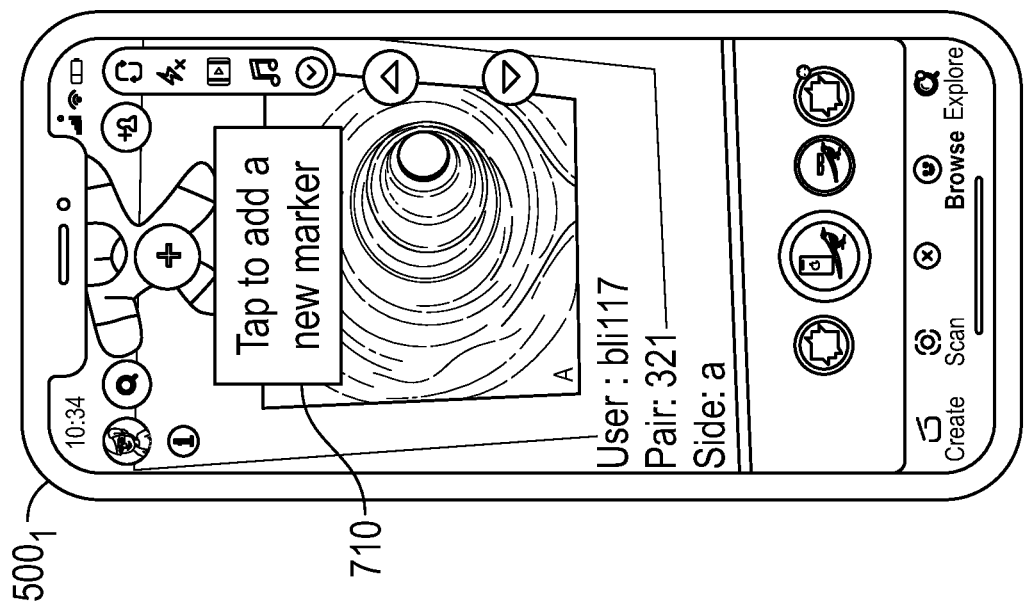
FIG. 7A is an illustration depicting an object used as a marker for establishing a social connection and FIG. 7B is a mobile device displaying a graphical user interface (GUI) for use in establishing an object as a marker for a user for establishing a social connection.
Figure 7A:
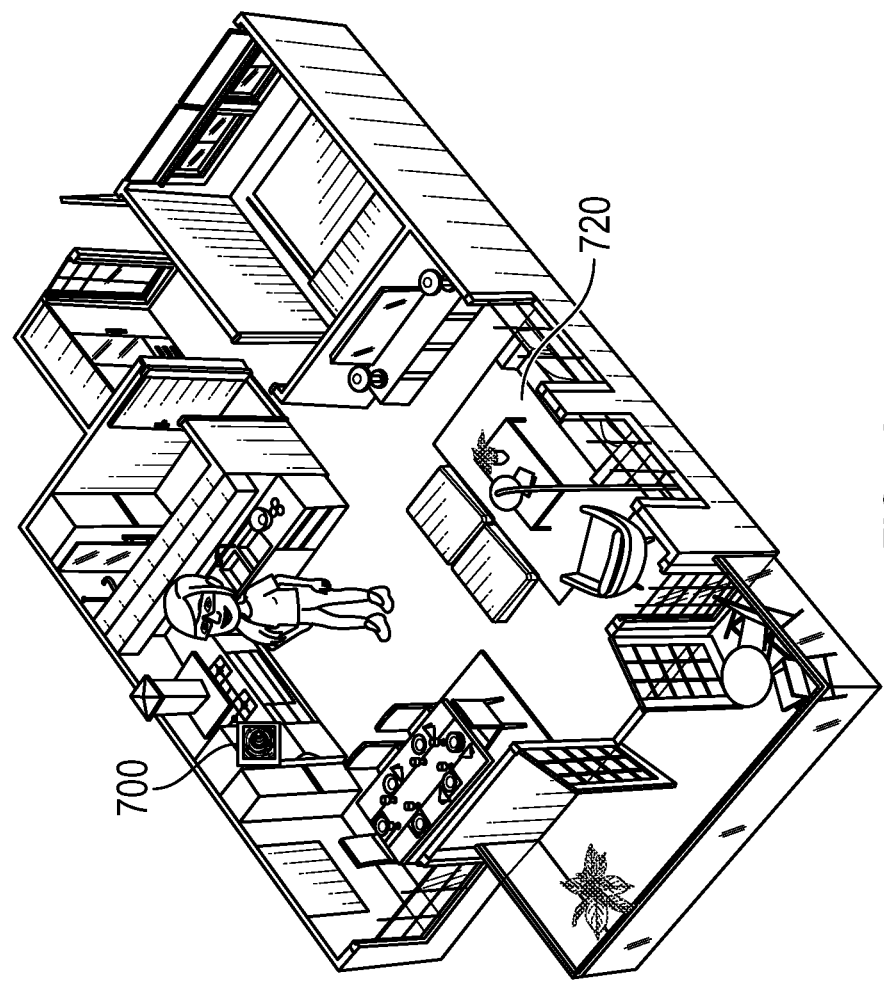

The illustration in FIG. 7A and the mobile device GUI in FIG. 7B illustrate establishing a first object as a marker for a first user for establishing a social connection in a sample configuration. Referring to FIG. 7A, a user of a messaging system would like to share an object with another user of the messaging system. User 1 establishes a local object as a marker—endpoint by selecting an image of an object 700 (e.g., refrigerator) in her apartment (FIG. 7B). Alternatively, an image of another object such as table 720 may be selected as a marker-endpoint. The mobile device application 515 of user 1's mobile device 500₁ then provides an object identifier and a picture of the selected object 700 or 720 to the server system 498. The object identifier may include a name provided by user 1. User 1 then uses the mobile device application 515 to connect the identified object 700 or 720 to an object similarly identified by user 2. The IDs, pictures, and provided names for the objects marked by the respective users are stored as part of a social media communications platform connecting user 1 and user 2. As noted above, the object markers are a proxy to actual object detection and may be generated on-the-fly. A plurality of such connections may be established between user 1 and user 2. The connections may be symmetric (such as from refrigerator-to-refrigerator) or asymmetric (such as from lamp-to-mug) and may be 1-1, 1-N, N-1, or N-N connections, where N is an integer.

Figure 8B:
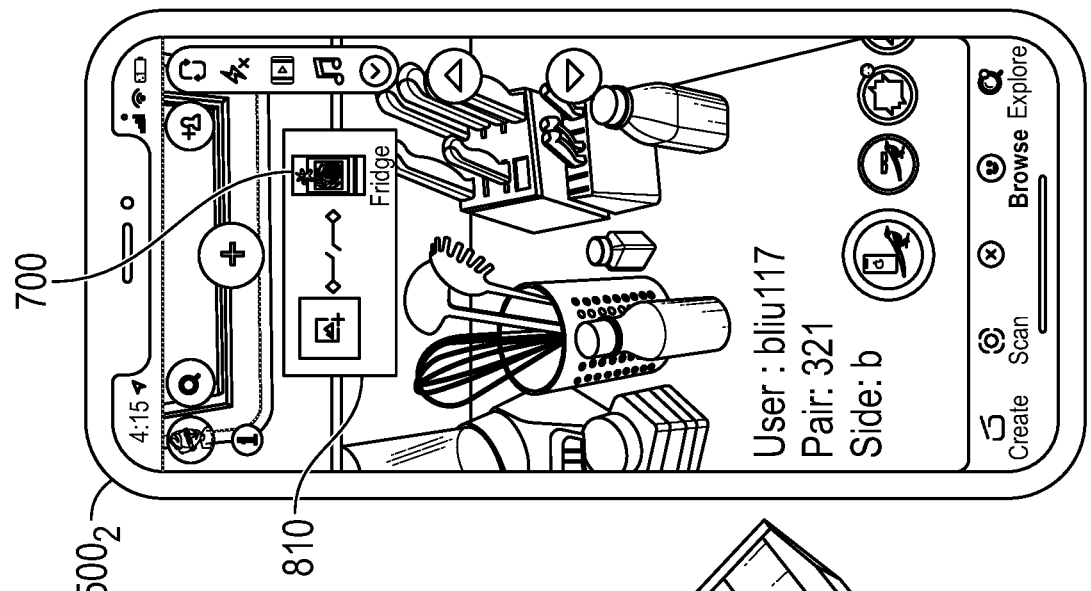
FIG. 8A is an illustration depicting completion of a social connection by establishing an object as a marker for another user and FIG. 8B is a mobile device displaying a GUI for use in completing a social connection by establishing an object in the environment of the other user as a marker.
Figure 8A:
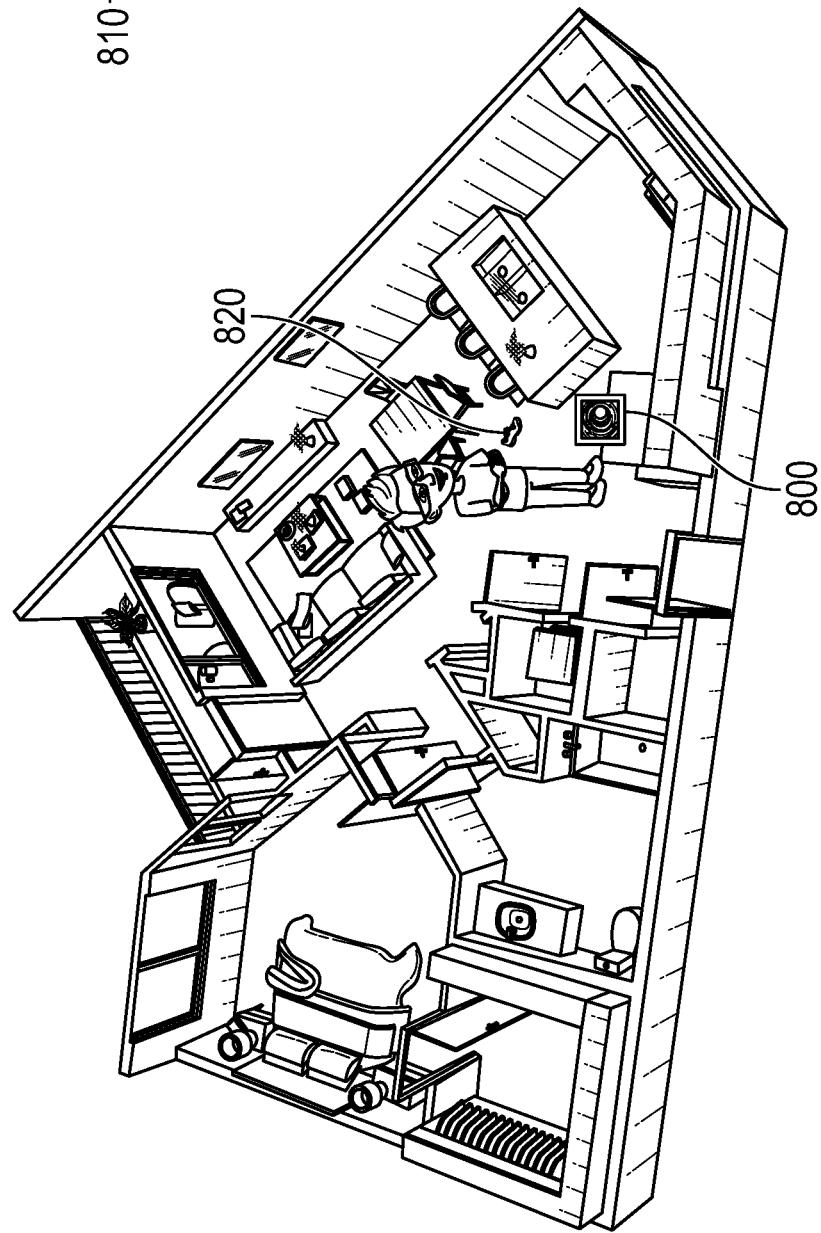

The illustration in FIG. 8A and the mobile device GUI in FIG. 8B illustrate completion of a social connection by establishing a second object as a marker for a second user in a sample configuration. As illustrated in FIG. 8A, user 2 identifies an object 800 (e.g., a cabinet) in his apartment in a similar manner as described above with respect to user 1. The process is omitted herein for the sake of brevity. As shown in FIG. 8B, providing a name such as "refrigerator" or "table" may facilitate connections with a corresponding object of user 1. User 2 also may use image capture software 470 of the user's electronic eyewear device 100 to capture a 3D scan of shoes 820 for sharing with user 1 through the established connection.

Figure 9:
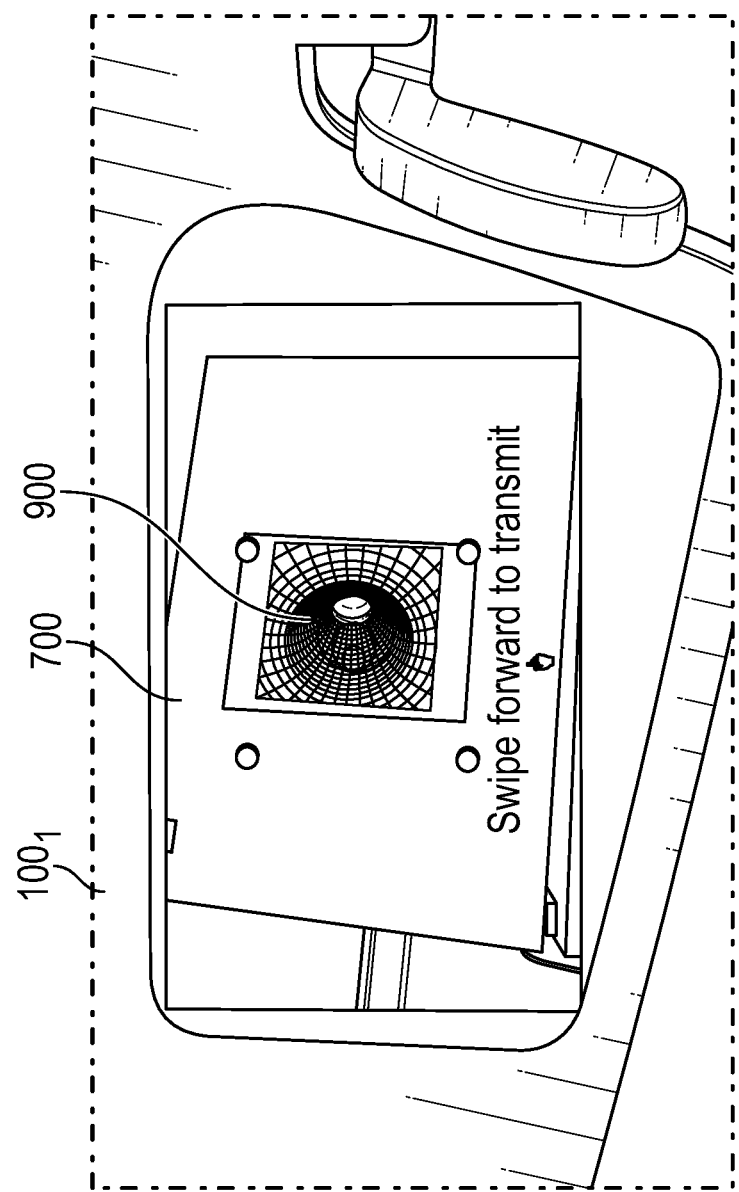
FIG. 9 is an illustration depicting a GUI for use in transmitting sparkles between users when one user glances at an object in the user's environment that has been established as a marker.

Now that a connection has been made between user 1's refrigerator 700 and user 2's cabinet 800, the system is ready to implement the social connectivity functionality. To activate the social connectivity features, user 1 may glance at her refrigerator 700 while wearing her electronic eyewear device 100₁. The GUI in FIG. 9 illustrates the transmission of sparkles between users when one user glances at the first object established as a marker. As shown in FIG. 9, the electronic eyewear device 100₁ scans user 1's surroundings and identifies the refrigerator 700 using object recognition capabilities of the electronic eyewear device 100₁. The object recognition capabilities include comparing an image of the object to images of known objects to find a match. To scan the user's surroundings for marker-endpoint objects or to identify objects to establish as marker-endpoint objects, the user's electronic eyewear device 100 may monitor the user's gaze direction and linear or rotational movement of the user's head to track the scene. A visual scan by the electronic eyewear device 100 can be activated with scan initiation means such as a button tap or a press and hold of a scan button at any time. In the case of a visual scan, the captured image may be forwarded to a trained neural network of a deep learning model on the electronic eyewear device 100. The visual scan also may be forwarded to services available on the server system 498 accessible to the electronic eyewear device 100 to process the captured image to identify objects in the scene. Alternatively, a voice scan may be initiated by a "wake word," which is a phrase that wakes the electronic eyewear device 100 from sleep to trigger a scan by the camera 150. "Signal descriptor text" may be presented to a display of the electronic eyewear device 100 as objects in the captured scene or words in the captured voice are recognized. Recognized objects may be identified as potential marker objects to be provided to the display of the electronic eyewear device 100 in response to the scan. Scan notifications such as sounds or displayed words or icons may be used to indicate when a background scan has been initiated. When the background scan has been completed, a notification of the completed scan results may be provided to the display.

If the refrigerator 700 is recognized in the scanned image, the electronic eyewear device 100₁ initiates a transmission of a communication to user 2 indicating that user 1 is active and has viewed the refrigerator 700. For example, the electronic eyewear device 100₁ may initiate the transmission of a communication that includes a link to invoke a preselected AR image or animation such as sparkles from user 1 to user 2 by glancing at the refrigerator 700 established as the marker—endpoint between user 1 and user 2. The electronic eyewear device 100₁ may present to user 1's display a representation of a wormhole 900 that is activated when the refrigerator 700 is viewed by user 1 and may present an animation showing the sparkles being sucked into the wormhole 900 for transmission via the wormhole 900 to user 2. The animation may also include corresponding sound effects. User 1's interaction with refrigerator 700 may be timestamped and the timestamp information provided with the communication (e.g., with the sparkles).

Figure 10:
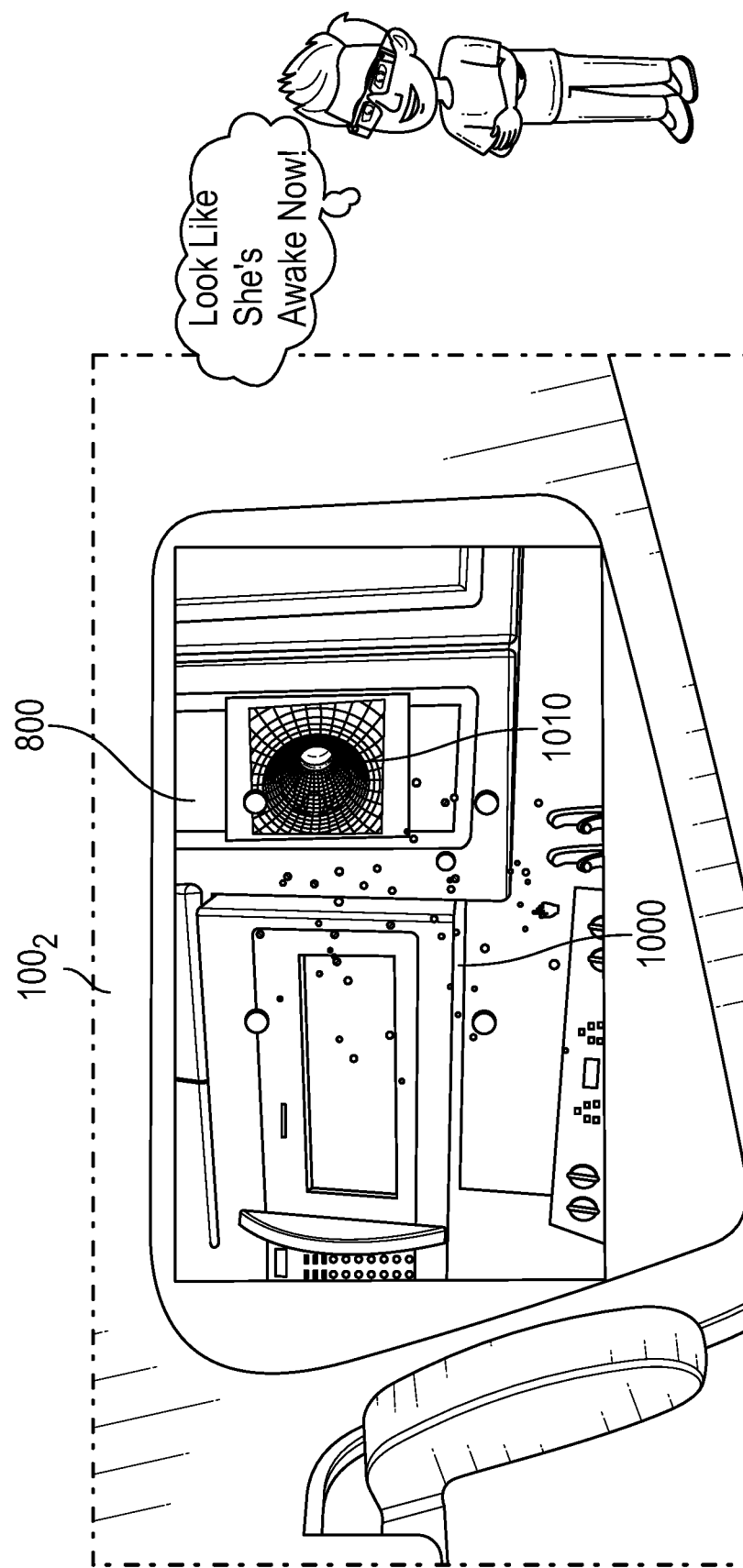
FIG. 10 is an illustration depicting a GUI for use in receiving the sparkles (FIG. 9) when the receiving user glances at an object in the receiving user's environment that has been established as a marker.

To receive the communication (sparkles) from user 1, user 2 puts on his electronic eyewear device 100₂ and glances at his marker-endpoint object 800 (e.g., cabinet) connected to user 1's object 700 (e.g., refrigerator). Upon user 2's electronic eyewear device 100₂ recognition of the object 800, any communication associated with object 800 is pushed from the server system 498 to user 2's electronic eyewear device 100₂. The GUI in FIG. 10 illustrates the reception of the sparkles transmitted in FIG. 9 by the receiving user glancing at the second object established as a marker. As shown in FIG. 10, upon recognition of the object 800, the sparkles 1000 invoked by the communication from user 1 are received and displayed as an AR overlay on the display of user 2's electronic eyewear device 100₂. The electronic eyewear device 100₂ may present to user 2's display a representation of a wormhole 1010 that is activated and may present an animation showing the sparkles being shot out of the wormhole 1010 to the display of user 2's electronic eyewear device 100₂. The animation may also include corresponding sound effects. Such presentation of the sparkles 1000 indicates to user 2 that user 1 is awake and active and has glanced at her refrigerator 700.

As another example, user 2 may respond to user 1 by sending a communication showing what he is doing and that he is thinking of user 1. User 2 decides to show user 1 that he is drinking coffee from a mug that user 1 gave to user 2 as a gift. As noted above, the duration of time in which user 2's marker (e.g., cabinet 800) is in user 2's field of view may determine what content is placed for user 1. A short period of time (e.g., <1 second) may trigger the placement of a simple effect, such as the sparkle effect received from user 1. However, a recognition by user 2's electronic eyewear device 100₂ that user 2 has been viewing the cabinet 800 for a longer predetermined period of time (e.g., ≥1 second) may trigger user 2's electronic eyewear device 100₂ to clone content from user 2's real-world surroundings. In this case, user 2 may elect to capture a snapshot of mug 1100 that user 1 gave to user 2 as a gift. The mug 1100 may be extracted from the captured snapshot using image capture software 470 of user 2's electronic eyewear device 100₂. Such image capture software 470 may segment the image from the surrounding image using image segmentation software, as desired. Alternatively, the segmented image may be processed by image processing software of the server system 498 to generate or to select from the gallery 490 a 2D or a 3D rendering of the segmented image. User 2's electronic eyewear device 100₂ also may present user 2 with the option of recording audio for a short duration of time (i.e., 5 seconds) to send with the segmented image of mug 1100.

Figure 11:
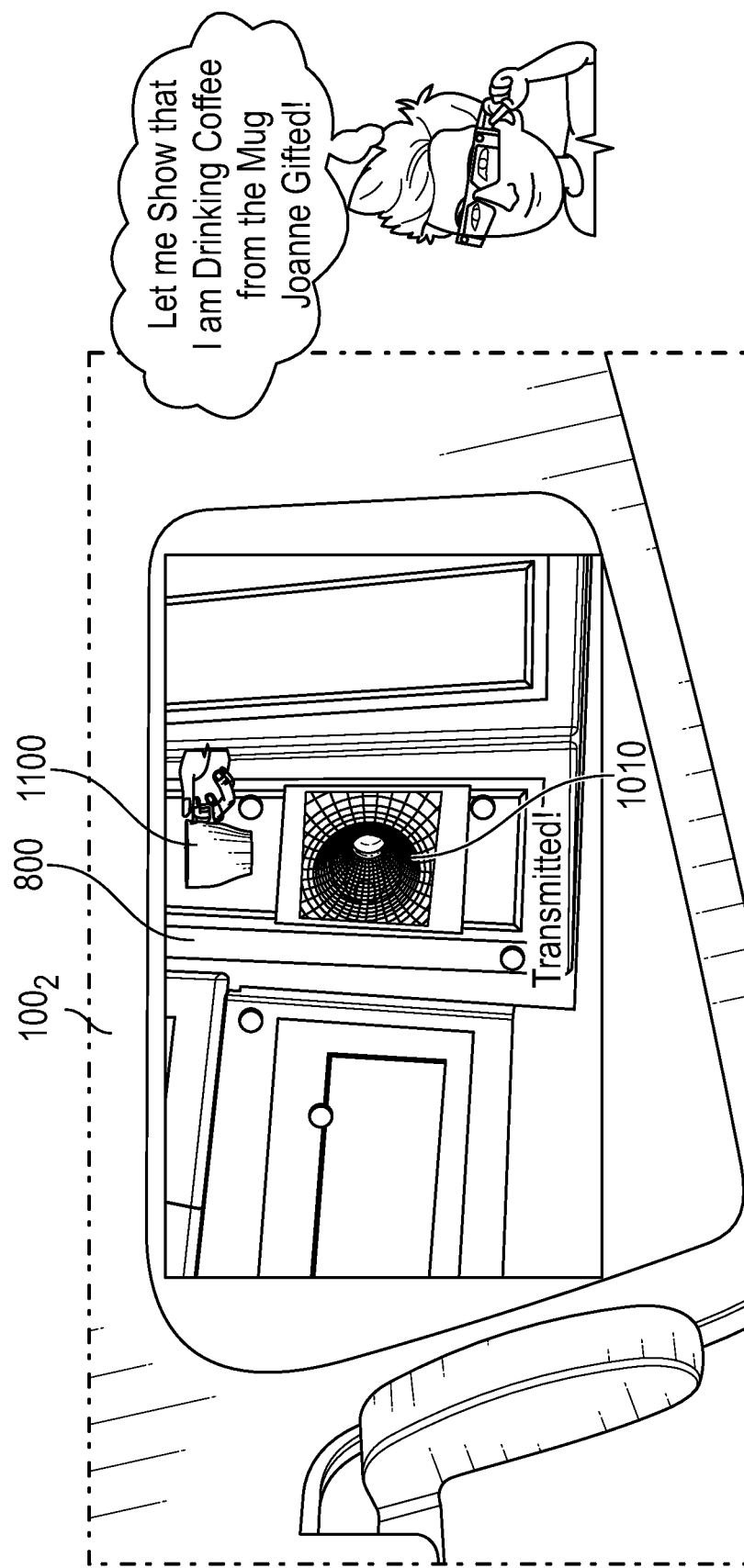
FIG. 11 is an illustration depicting a GUI for use in transmitting an object segmented from the surroundings (a mug) for transmission between users via the connection between the markers of FIGS. 9 and 10.

Once the segmented mug image 1100 and the audio recording are captured, user 2 may swipe forward or provide a recognized gesture to transmit an image of the mug 1100 with the audio recording to user 1. The GUI in FIG. 11 illustrates the transmission of an object segmented from the surroundings (a mug) for transmission between users via the connection between the markers of FIGS. 9 and 10. As shown in FIG. 11, the electronic eyewear device 100₂ may present to the display of user 2's electronic eyewear device 100₂ a representation of the image of the mug 1100 in front of wormhole 1010. User 2's electronic eyewear device 100₂ may also present an animation showing the wormhole 1010 being activated and sucking an image of the mug 1100 into the wormhole 1010, along with associated sound effects.

Figure 12:
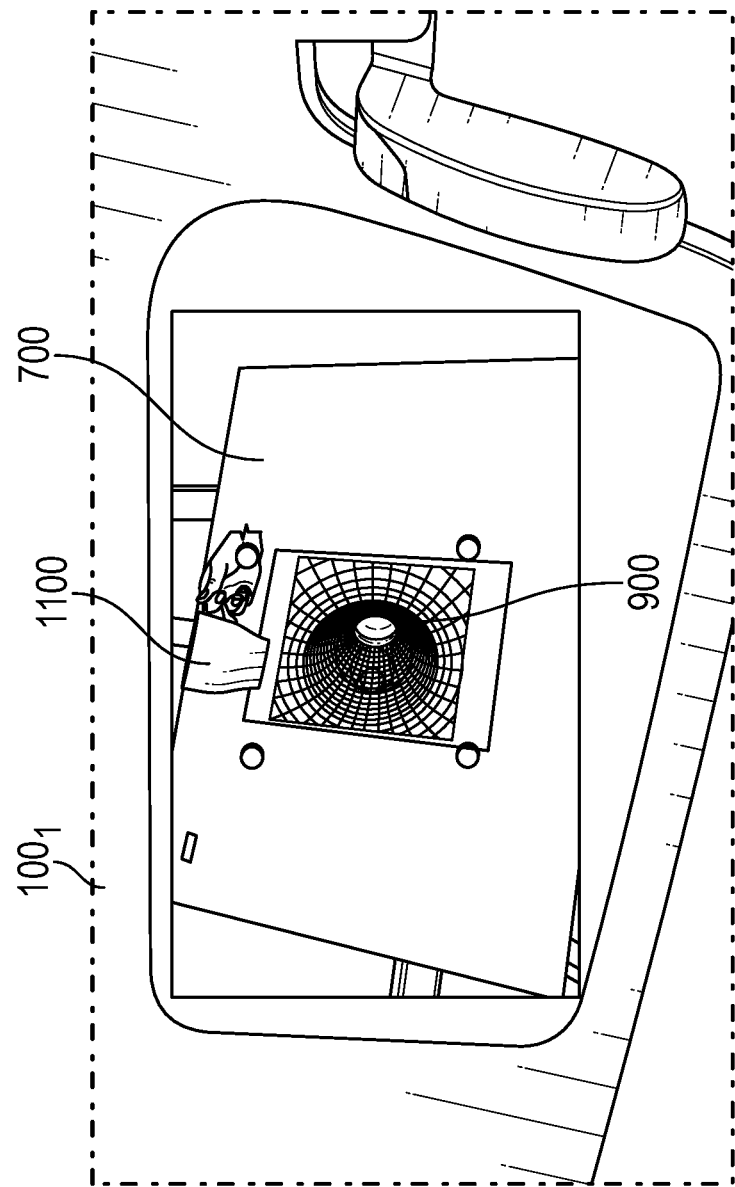
FIG. 12 is an illustration depicting a GUI for use in receiving the object (mug) transmitted (FIG. 11) via the connection generated between the markers in the respective users' environments.

To receive the communication including the image of mug 1100 from user 2, user 1 glances at her marker-endpoint object 700 (e.g., refrigerator) connected to user 2's object 800 (e.g., cabinet). Upon user 1's electronic eyewear device 100₁ recognition of the object 700, any communication associated with object 700 is pushed from the server system 498 to user 1's electronic eyewear device 100₁. The GUI in FIG. 12 illustrates receipt of the object (mug) transmitted in FIG. 11 via the connection generated between the markers in the respective users' environments. As shown by the GUI in FIG. 12, upon recognition of the object 700, the snapshot of mug 1100 from user 2 is received and displayed as an AR overlay on the display of user 1's electronic eyewear device 100₁. The electronic eyewear device 100₁ may present to user 1's display a representation of a wormhole 900 that is activated and presents an animation showing the image of the mug 1100 appearing out of the wormhole 900 to the display of user 1's electronic eyewear device 100₁, along with optional sound effects associated with the presentation of the image. Such presentation of the image of the mug 1100 along with the playback of the audio recording from user 2 indicates to user 1 that user 2 is drinking coffee from a mug that user 1 gave to user 2 as a gift. Thus, user 1 may appreciate that user 2 thought of user 1 during user 2's coffee break.

Figure 13A:
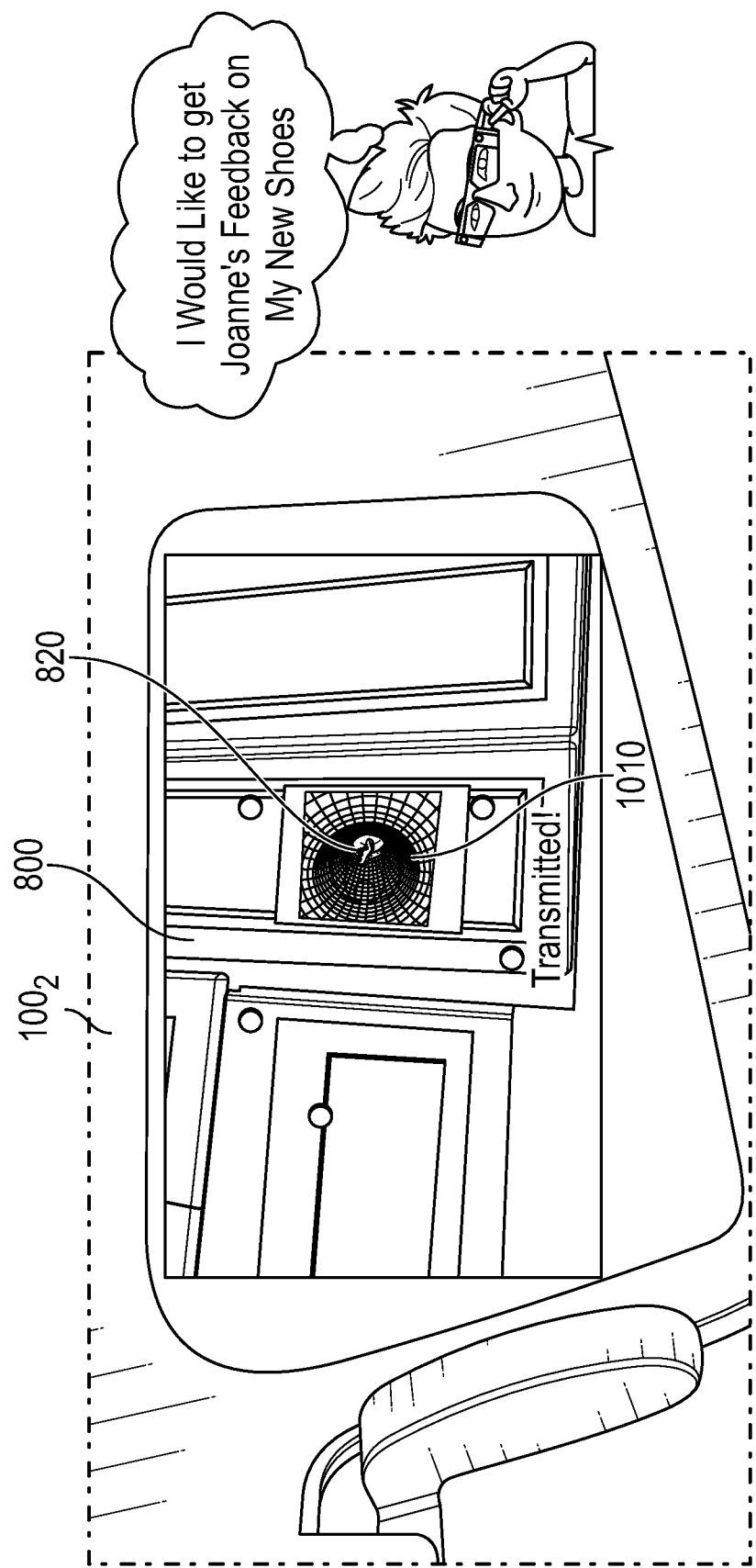
FIG. 13A is an illustration depicting a GUI for use in transmitting a 3D scanned shoe via the connection generated between the markers in the respective users' environments.
Figure 13B:
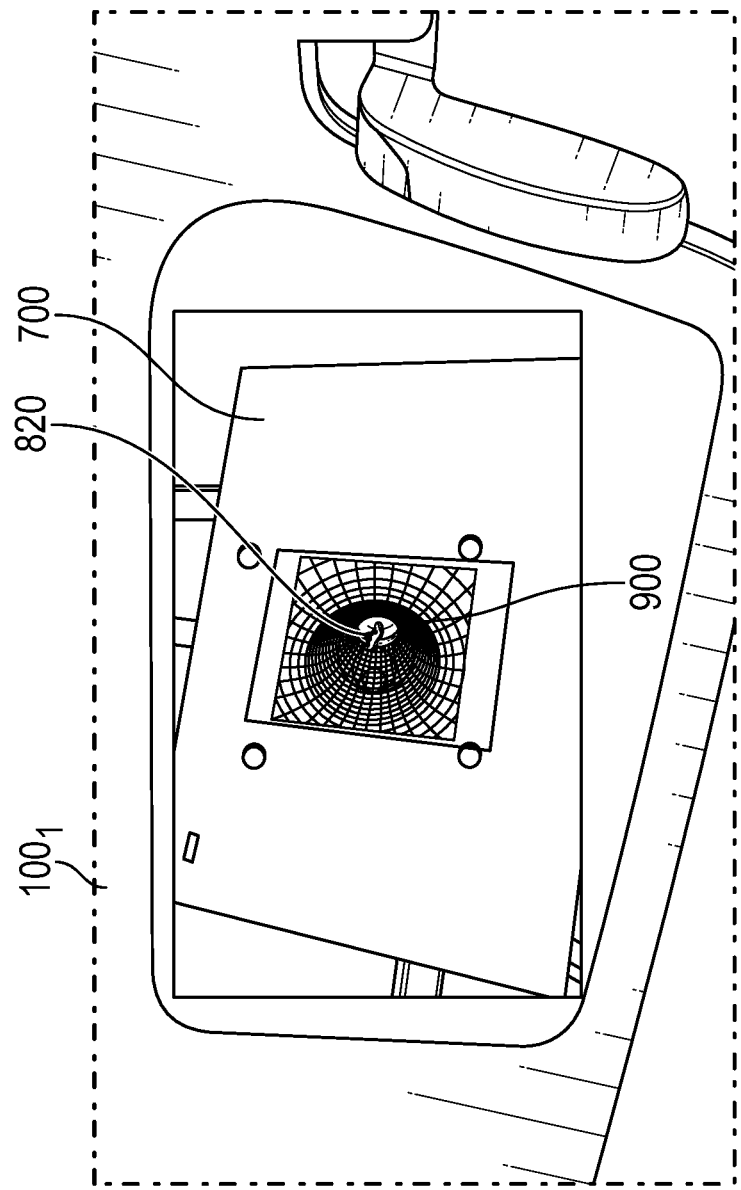
FIG. 13B is an illustration depicting a GUI for use in receiving the 3D scanned shoe transmitted (FIG. 13A) via the connection generated between the markers in the respective users' environments.
Figure 14:
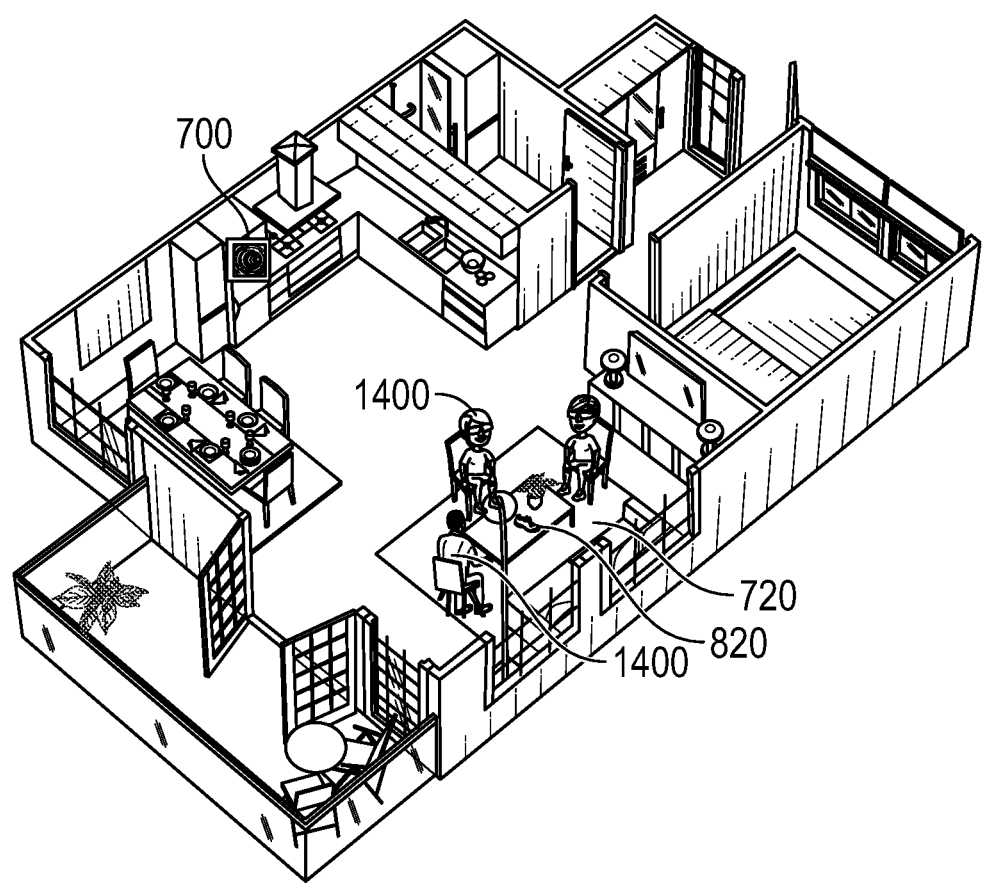
FIG. 14 is an illustration depicting the sharing of the received 3D scanned shoe with co-located users.

The GUI in FIG. 13A illustrates the transmission of a 3D scanned shoe via the connection generated between the markers in the respective users' environments, while the GUI in FIG. 13B illustrates receipt of the 3D scanned shoe transmitted in FIG. 13A via the connection generated between the markers in the respective users' environments. In this example, user 2 may respond to user 1 by providing a 3D AR object such as a 3D scan of a shoe 820 (FIG. 13A). In this example, the 3D scan of the shoe 820 may be associated with a marker or may be sent directly as an attachment to a message sent to user 1 via a messaging application. Upon receipt of the 3D shoe scan 820 (FIG. 13B), user 1 may opt to share the 3D shoe scan 820 with co-located users to receive comments and feedback before responding to user 2. In this case, user 1 may use collaboration software 480 to establish a session with co-located users. As noted above, user 1 may receive a push notification indicating that she has received the 3D shoe scan 820 from user 2. The received 3D AR shoe scan 820 may be associated with a marker (e.g., table 720 in the room with user 1) or may be sent as an attachment to a chat message sent to user 1. User 1 may share the received 3D shoe scan 820 with other persons co-located with user 1 using collaboration software 480 to initiate a sharing session with the co-located users via a local communications network such as BLU-ETOOTH® or WI-FI® within a limited distance (e.g., 30 feet) of user 1. The received 3D shoe scan 820 may be distributed via the collaboration application 480 directly or may be distributed by AIRDROP®, etc. for interaction by the co-located users. Alternatively, it will be appreciated that when the other users are co-located virtually that the communications with the other users may be through other communications channels such as a local area network, a wide area network, the Internet, and the like.

The collaboration software 480 on the user devices of the co-located users enables the co-located users to also view and interact with the 3D shoe scan 820 provided by user 2 and distributed via the session with user 1. Alternatively, the collaboration software 480 may be provided on the server system 498 to enable the respective users in a session to collaborate via the collaboration software 480 to modify (e.g., annotate, manipulate, adjust, or a combination thereof) the 3D shoe scan 820 using AR manipulation tools of the collaboration software 480. Upon receipt of the 3D shoe scan 820 by user 1 or upon user 1's electronic eyewear device 100₁ recognition of a marker object 700 or 720, any communication associated with the marker object 700 or 720 is pushed from the server system 498 to user 1's electronic eyewear device 100₁. Upon recognition of the marker object 700 or 720 or receipt of the 3D shoe scan 820 as an attachment to a chat message, the 3D shoe scan 820 from user 2 is received and displayed as an AR overlay on the display of user 1's electronic eyewear device 100₁. User 1 may then identify other users with whom user 1 wishes to share the 3D shoe scan 820 and initiates collaboration software 480 to establish a distributed collaboration session with the identified users.

As desired, metadata associated with the shared 3D shoe scan 820 may indicate whether the 3D shoe scan 820 may be shared with other parties or is private to user 1 or a subset of other possible users. The system may evaluate the metadata associated with the shared 3D scan 820 to determine whether the privacy settings permit a collaboration session with the identified users.

AR display tools of the collaboration software 480 enable the respective session participants to modify the shared 3D shoe scan 820. In sample configurations, all session participants may see the same view of the shared 3D shoe scan 820 as the respective users manipulate it. Alternatively, the eyewear devices 100 of the respective session participants may determine the direction and orientation of the user's head to determine which view of the shared 3D shoe scan 820 to provide to the respective users. For example, if the respective users 1400 sharing the view of the 3D shoe scan 820 are located around table 720 (FIG. 14) including a marker-endpoint for receiving AR objects from user 2, the 3D shoe scan 820 may be provided in the middle of table 720. The eyewear devices 100 of the respective users 1400 may present a view of the 3D shoe scan 820 determined by the respective users' positions and orientations around the table 720. The system thus provides the same view or different views to the respective users according to each user's viewpoint. A global positioning system (GPS) chip, a head movement tracker 109, an inertial monitoring unit (IMU), a magnetometer, or any combination thereof, may be provided on the electronic eyewear devices 100 worn by the respective users 1400 to determine the position and orientation of each user with respect to the position of the 3D shoe scan 820 in the center of the table 720 and to register the position and orientation of the 3D shoe scan 820 with the position and orientation of each user. Thus, each user 1400 would have a different view of the 3D shoe scan 820 just as she would were a real shoe placed in the center of the table 720. Manipulations of the 3D shoe scan 820 also would be viewed from each user's position and orientation about the table 720.

Figure 15:
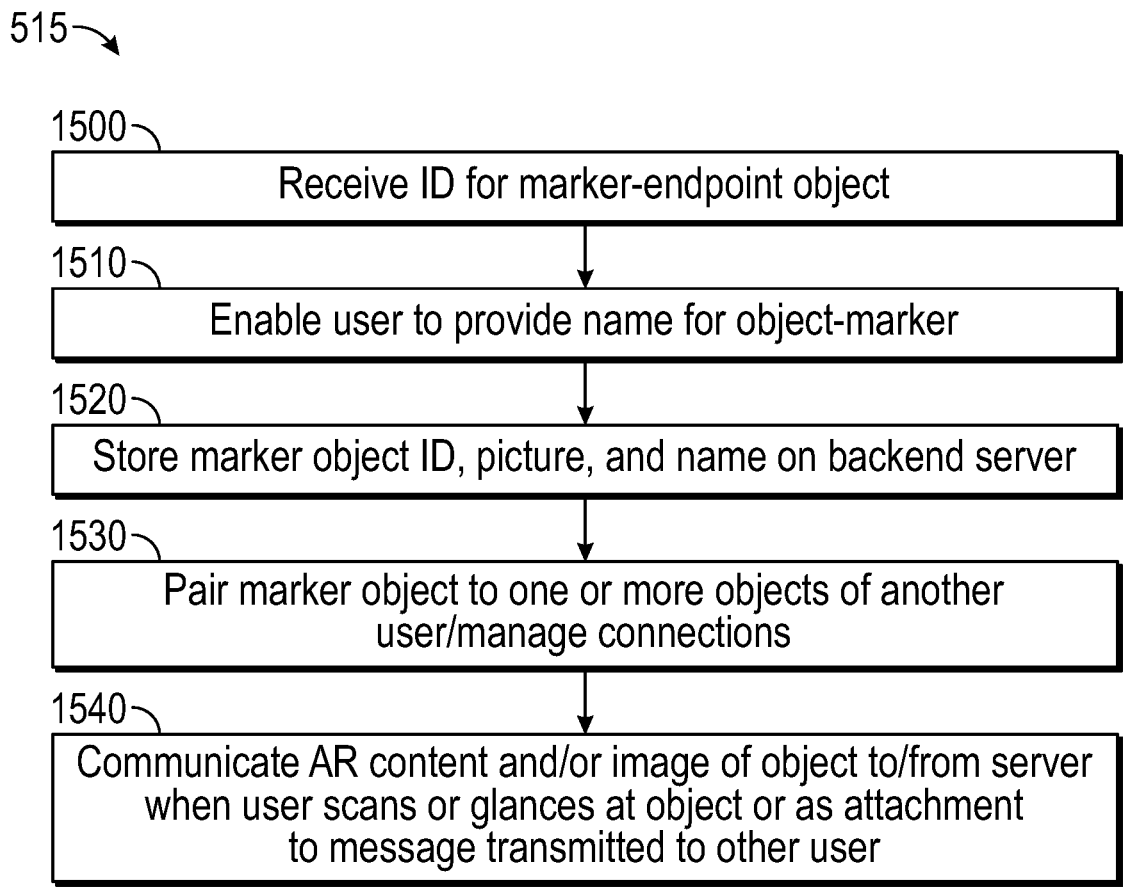
FIG. 15 is a flow chart of steps implemented by the mobile device for providing object pairing and managing connections.

The flow chart in FIG. 15 depicts steps implementing the functionality performed by the mobile device 500 associated with the electronic eyewear device 100 to provide object pairing and to manage connections in a sample configuration. Such functionality may be implemented as object pairing/connection management software 515 in FIG. 5.

As indicated in FIG. 15, the mobile device 500 receives an identification tag (ID) at 1500 for a marker-endpoint object selected by the user of the associated electronic eyewear device 100. The user is presented with the option at 1510 to provide a name for the identified marker-endpoint object. For example, if the marker-endpoint object is the user's refrigerator, the user may name the marker "refrigerator." Such naming facilitates pairing by another user. In certain configurations, it may be desirable to name another user as the marker-endpoint object, in which case, any AR objects or images of real-world objects would proceed directly to the mobile device 500, the electronic mobile device of the other user, or both. In this latter case, the other user would be a user-endpoint object.

At 1520, the marker-endpoint object ID, its picture, and its name are stored on the server system 498 to facilitate pairing with other users. At 1530, the user may access the marker-endpoint objects of another user for pairing with the identified marker-endpoint object. In this case, the other user's marker-endpoint objects with their pictures, names, and IDs are presented to the display of the user's mobile device 500 for selection. The selected marker-endpoint objects of the other user are paired with the user's marker-endpoint object and the connection is stored in the server system 498. The other user's marker-endpoint object may also include the user herself. In this case, the ID would be the user ID and the image would be an image of the user. The user endpoint would be the IP address of the user's mobile device 500 or electronic eyewear device 100. The user may also manage her connections by updating the marker-endpoint objects of the other user that are connected to marker-endpoint objects in the surroundings of the user.

Once the connections have been so established, the AR content stored in the gallery 490 of the server system 498, a snapshot of the object provided by the electronic eyewear device 100, or both may be invoked by communications to/from the server system 498 and the other user's electronic eyewear device 100₂ at 1540 when the respective users scan or glance at their respective marker-endpoint objects that are the respective marker-endpoint objects of the connection(s) between the users. Alternatively, the AR content may be provided at 1540 directly to another user as an attachment to a message transmitted to the other user via a messaging application such as SNAPCHAT® available from Snap, Inc. of Santa Monica, California.

Figure 16:
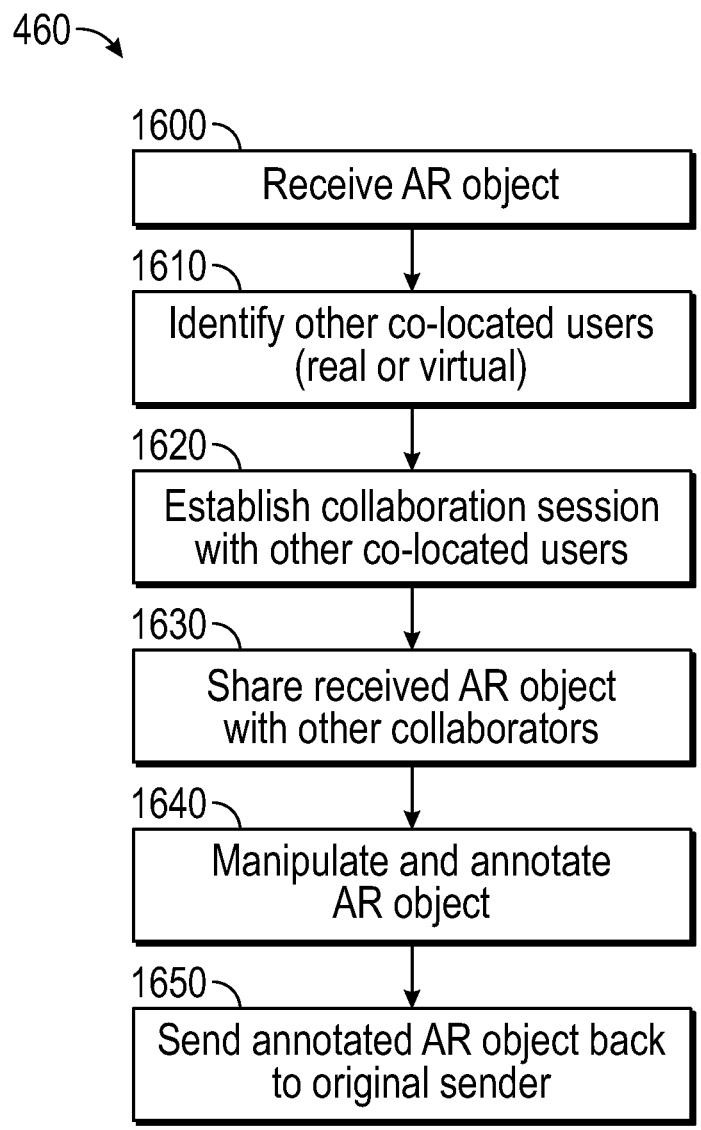
FIG. 16 is a flow chart of steps implemented by the electronic eyewear device for sharing 3D AR objects with other users.

FIG. 16 is a flow chart implemented by the electronic eyewear device 100 for sharing 3D AR objects with other users in a sample configuration. Such functionality may be implemented as object/marker recognition and connection software 460 and collaboration software 480 in FIG. 4.

As illustrated in FIG. 16, the electronic eyewear device 100 receives an AR object at 1600. The AR object may be received in response to scanning the scene with the user's electronic eyewear device 100 to identify a marker-endpoint that is forwarded to a trained neural network of a deep learning model on the electronic eyewear device 100 or to services available on the server system 498 accessible to the electronic eyewear device 100 to process the captured image to identify one or more marker-endpoints in the scene. An ID for the identified marker-endpoint is provided for tracking purposes, and the ID and picture of the object may be provided to the associated mobile device 500 for pairing (FIG. 15). The AR object associated with the identified marker-endpoint may be provided to the marker-endpoint as described above. However, such pairing is not necessary as the AR object instead may be sent to the user using any conventional communication device, such as SMS (Short Message Service) text, email, or a messaging application such as SNAPCHAT® available from Snap, Inc. of Santa Monica, California.

The electronic eyewear device 100 may receive and display any content that has been provided by another user having an object paired to the identified object. This content may be stored at the server system 498 and invoked by a communication to the user's electronic eyewear device 100 upon detection of the paired object in the scanned image. As noted above, depending on the setting, the AR content may accumulate and build up (persistent data) or fade away after viewing (transient data). Over time, the AR content's color may fade away to indicate how long ago the user performed an activity. The time of the activity may also be recorded, and the AR content may be stored in a message gallery 490, as desired. The selected snapshot or AR object or segmented object from a real-world scene is invoked by a communication sent to the mobile device 500 over the network 495 to the server system 498. The server system 498, in turn, provides the invoked image to the electronic eyewear device 100 of the other user for viewing adjacent the paired marker object(s) when the other user views the paired marker object(s). Alternatively, the electronic eyewear device 100 may communicate directly with the server system 498, provided the electronic eyewear device 100 has the requisite circuitry to communicate directly over an Internet connection. The communication may be picked up by the user by conventional means without pairing, such as directly via their electronic eyewear device 100 or their mobile device 500.

Once the user has received the AR object from the remote user at 1600, the user may identify at 1610 other co-located users with whom the user wishes to share the received AR object. For example, the user may have a messaging application that establishes which "friends" are nearby (within a few feet) whereby the user may selectively contact the identified "friends" to establish a collaboration session for sharing the received 3D AR object. Alternatively, the messaging application may identify local users on the local network (e.g., local WI-FI® network) and invite one or more of such local users to participate in a collaboration session for sharing the received 3D AR object, assuming the metadata associated with the 3D AR object does not prohibit such sharing. When the collaborators are virtually co-located in a virtual environment, the communications would be via a wide area network or the Internet. The collaboration session is then established with the identified users using the collaboration software 480 at 1620.

Once the collaboration session has been established at 1620, the received 3D object is shared with the other collaborators at 1630. The received 3D object may be pushed to other collaborators with a prompt to accept the collaboration request. As noted above, each collaborating user may receive the same view of the received 3D object or may receive a view of the object that is determined by the GPS position and orientation of the head of the collaborating user relative to the position of the marker or the received AR object. Thus, at 1630, the electronic eyewear device 100 may determine a position and orientation of a head of the user and change a presentation perspective of the received 3D object to the user as the position and orientation of the head of the user relative to the 3D object is changed.

At 1640, the collaborating users may use the features of the collaboration software 480 to manipulate the object and to add annotations to the received AR object. The annotations may be visual or may be auditory messages attached to the received AR object.

At any time during the collaboration, the annotated AR object may be sent back to the original sender at 1650. One of the collaborators may use the connection between marker-endpoints or may send a message with the annotated AR object as an attachment.

It will be further appreciated that the server system 498 may maintain a gallery 490 of AR content and images (with or without annotations) that users have exchanged with each other via particular connections much in the same way that SMS messaging systems maintain a record of texts sent back and forth between users or messaging systems such as SNAPCHAT® available from Snap, Inc. of Santa Monica, California, maintain communications in a Memories feature. The stored AR content and images may be presented to the display of the user's electronic eyewear device 100 for selection, as desired, in the event that the user wishes to resend a previously sent image. In one configurations, the AR content may be AR overlays such as Lenses available from Snap, Inc. of Santa Monica, California. Alternatively, the received image may be a photo or a three-dimensional scan of any real-world object, such as the two-dimensional cup or the three-dimensional scan of a shoe described in the above examples.

In another alternative configuration, rather than gazing at a marker-endpoint object, the electronic eyewear device 100 may track the global positioning system (GPS) coordinates of an object during respective scans. Then, when the object is moved between scans, the communication of AR elements (e.g., sparkles) or scanned objects may be triggered. Similarly, the marker-endpoint object may be the paired user's mobile device, whereby the AR object or segmented image is provided to the paired user's paired electronic eyewear device 100 irrespective of the paired user's location.

It will be appreciated by those skilled in the art that the methods described herein may be initiated and conducted without any particular gestures or touch operations. The actions may be activated from processing of the images in the scene to trigger the indicated effects when the marker-endpoint object is viewed, for example. The image extraction may be conducted by staring at the marker-endpoint object for the predetermined duration of time and then focusing on the object to be extracted and sent, all without any hand gestures or manual selection. Of course, hand gestures and button press selection on the electronic eyewear device 100 may also be used to select and transmit an AR object and to modify a received object in sample configurations.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are the best mode and other examples, it is understood that various modifications may be made therein and that the subject matter disclosed herein may be implemented in various forms and examples, and that they may be applied in numerous applications, only some of which have been described herein. It is intended by the following claims to claim all modifications and variations that fall within the true scope of the present concepts.

What is claimed is:

1. A head-mounted electronic eyewear device of a first user, comprising:
   a camera;
   a memory that stores instructions; and
   a processor that executes the instructions to:
   pair a first real world object in an environment of the first user with a second real world object in a remote environment of a second user to generate a communication connection between a first marker associated with the first real world object and a second marker in the remote environment associated with the second real world object;

receive an augmented reality (AR) object associated with the second marker via the communication connection when the second real world object is in a field of view of an electronic eyewear device of the second user;

identify a co-located user of the first user for sharing of the AR object to a head-mounted electronic eyewear device of the co-located user, wherein the co-located user is located in a same virtual or physical environment as the first user;

establish a collaboration session between the head-mounted electronic eyewear devices of the first user and the co-located user; and share the AR object with the co-located user via the collaboration session.

2. The electronic eyewear device of claim 1, wherein execution of the instructions causes the processor to receive and display a modification of the AR object by the co-located user.

3. The electronic eyewear device of claim 2, wherein execution of the instructions causes the processor to forward the modification of the AR object to the electronic eyewear device of the second user.

4. The electronic eyewear device of claim 2, wherein execution of the instructions causes the processor to receive the modification of the AR object as an attachment to a chat message in a messaging application.

5. The electronic eyewear device of claim 1, wherein execution of the instructions causes the processor to identify the co-located user for sharing of the AR object by determining what other users are within range of a local communication network for establishing the collaboration session over the local communication network.

6. The electronic eyewear device of claim 5, wherein execution of the instructions causes the processor to execute a messaging application that establishes which friends in the context of the messaging application are within range of the local communication network.

7. The electronic eyewear device of claim 5, wherein execution of the instructions causes the processor to establish the collaboration session with the other users within range of the local communication network for sharing the received AR object.

8. The electronic eyewear device of claim 1, wherein execution of the instructions causes the processor to:
determine a position and orientation of a head of the co-located user; and
change a presentation perspective of the received AR object to the co-located user as the position and orientation of the head of the co-located user relative to the AR object is changed.

9. The electronic eyewear device of claim 2, wherein execution of the instructions causes the processor to annotate the AR object with at least one of a verbal message, a textual message, or an augmented reality (AR) overlay.

10. The electronic eyewear device of claim 1, wherein execution of the instructions causes the processor to:
determine from metadata associated with the AR object whether the AR object may be shared with the co-located user,
wherein the collaboration session is established with the co-located user when the metadata associated with the AR object permits sharing of the AR object with the co-located user.

11. A method of sharing an augmented reality (AR) object, comprising:

pairing a first real world object in an environment of a first user with a second real world object in a remote environment of a second user to generate a communication connection between a first marker associated with the first real world object and a second marker in the remote environment associated with the second real world object;

receiving, by a head-mounted electronic eyewear device of the first user via the communication connection, the AR object when the second real world object is in a field of view of an electronic eyewear device of the second user, wherein the AR object is associated with the identified second marker;

identifying, by the head-mounted electronic eyewear device of the first user, at least one co-located user for sharing of the AR object to a head-mounted electronic eyewear device of the co-located user, wherein the co-located user is located in a same virtual or physical environment as the first user;

establishing, by the head-mounted electronic eyewear device of the first user, a collaboration session between the head-mounted electronic eyewear devices of the first user and the co-located user; and sharing, by the head-mounted electronic eyewear device of the first user, the AR object with the co-located user via the collaboration session.

12. The method of claim 11, further comprising receiving and displaying a modification of the AR object by the co-located user.

13. The method of claim 12, further comprising forwarding the modification of the AR object to the electronic eyewear device of the second user.

14. The method of claim 12, wherein the modification of the AR object is received from the co-located user as an attachment to a chat message in a messaging application.

15. The method of claim 11, wherein identifying the co-located user for sharing of the AR object comprises determining what other users are within range of a local communication network for establishing the collaboration session over the local communication network.

16. The method of claim 15, wherein determining what other users are within range of a local communication network comprises executing a messaging application that establishes which friends in the context of the messaging application are within range of the local communication network.

17. The method of claim 11, further comprising:
determining a position and orientation of a head of the co-located user; and
changing a presentation perspective of the received AR object to the co-located user as the position and orientation of the head of the co-located user relative to the AR object is changed.

18. A non-transitory computer-readable storage medium that stores instructions that when executed by at least one processor cause the at least one processor to share an augmented reality (AR) object by performing operations including:

pairing a first real world object in an environment of a first user with a second real world object in a remote environment of a second user to generate a communication connection between a first marker associated with the first real world object and a second marker in the remote environment associated with the second real world object;

receiving at a head-mounted electronic eyewear device of the first user via the communication connection, the AR object when the second real world object is in a field of view of an electronic eyewear device of the second user, wherein the AR object is associated with the second marker;

identifying at least one co-located user of the first user for sharing of the AR object to a head-mounted electronic eyewear device of the co-located user, wherein the co-located user is located in a same virtual or physical environment as the first user;

establishing a collaboration session between the head-mounted electronic eyewear devices of the first user and the co-located user; and sharing the AR object with the co-located user via the collaboration session.

* * * * *